United States Patent
Kraemer et al.

(10) Patent No.: US 9,077,092 B2
(45) Date of Patent: Jul. 7, 2015

(54) ELECTRIC SPRING TERMINAL UNIT AND ELECTRIC CONNECTING DEVICE

(75) Inventors: Rudolf Kraemer, Lautertal (DE); Andreas Leonhard, Darmstadt (DE)

(73) Assignee: Tyco Electronics AMP GmbH, Bensheim (DE)

( * ) Notice: Subject to any disclaimer, the term of this patent is extended or adjusted under 35 U.S.C. 154(b) by 288 days.

(21) Appl. No.: 13/639,687

(22) PCT Filed: Apr. 4, 2011

(86) PCT No.: PCT/EP2011/055214
§ 371 (c)(1),
(2), (4) Date: Oct. 5, 2012

(87) PCT Pub. No.: WO2011/124556
PCT Pub. Date: Oct. 13, 2011

(65) Prior Publication Data
US 2013/0029542 A1    Jan. 31, 2013

(30) Foreign Application Priority Data

Apr. 8, 2010   (DE) .................. 10 2010 003 752
Jun. 4, 2010   (DE) .................. 10 2010 029 714

(51) Int. Cl.
*H01R 4/48*       (2006.01)
*H02S 40/34*      (2014.01)
*H01R 12/57*      (2011.01)

(52) U.S. Cl.
CPC .............. *H01R 4/4809* (2013.01); *H01R 12/57* (2013.01); *H02S 40/34* (2014.12)

(58) Field of Classification Search
USPC ........................................ 439/828, 825, 835
IPC .................. H01R 13/052, 13/20, 13/17, 4/4845, H01R 4/4827
See application file for complete search history.

(56) References Cited

U.S. PATENT DOCUMENTS 4,708,417 A * 11/1987 Woertz .......................... 439/828

(Continued)

FOREIGN PATENT DOCUMENTS

DE  10 2006 056259 A1  5/2008
EP        2093806 A1   8/2009
WO    WO 00/31830 A1   6/2000

OTHER PUBLICATIONS

International Search Report and Written Opinion issued by the European Patent Office, dated May 10, 2011, for related International Application No. PCT/EP2011/055214; 10 pages.

(Continued)

*Primary Examiner* — Hien Vu
(74) *Attorney, Agent, or Firm* — Faegre Baker Daniels LLP

(57) ABSTRACT

The invention relates to an electrical spring clamping means for an electrical connection device (1), in particular a connection device (1) for a photovoltaic solar module (4), with an electrical contact section (111, 511) and a clamping spring (120, 520) which cooperates therewith, wherein the clamping spring (120, 520) in its open position (O) is arranged under mechanical pre-stress on/in the electrical spring clamping means (100), and an electrical contact tongue (415) of an electrical mating contact element (412) can be pressed against the electrical contact section (111, 511) by means of the clamping spring (120, 520), in the closed position (S) thereof. Further, the invention relates to an electrical lead frame or an electrical conductor bar for an electrical connection device (1), in particular a connection device (1) for a photovoltaic solar module (4), with an electrical spring clamping means (100) according to the invention, with a contact cage (110) of the electrical spring clamping means (100) being a constituent of the lead frame (150) or of the conductor bar (170) and the lead frame (150) or the conductor bar (170) optionally being encapsulated. Furthermore, the invention relates to an electrical connection device, in particular a connection device (1) for a photovoltaic solar module (4), with a electrical spring clamping means (100) according to the invention or with an electrical lead frame (150) according to the invention or an electrical conductor bar (170) according to the invention.

18 Claims, 20 Drawing Sheets

(56) References Cited

U.S. PATENT DOCUMENTS

Figure 1:
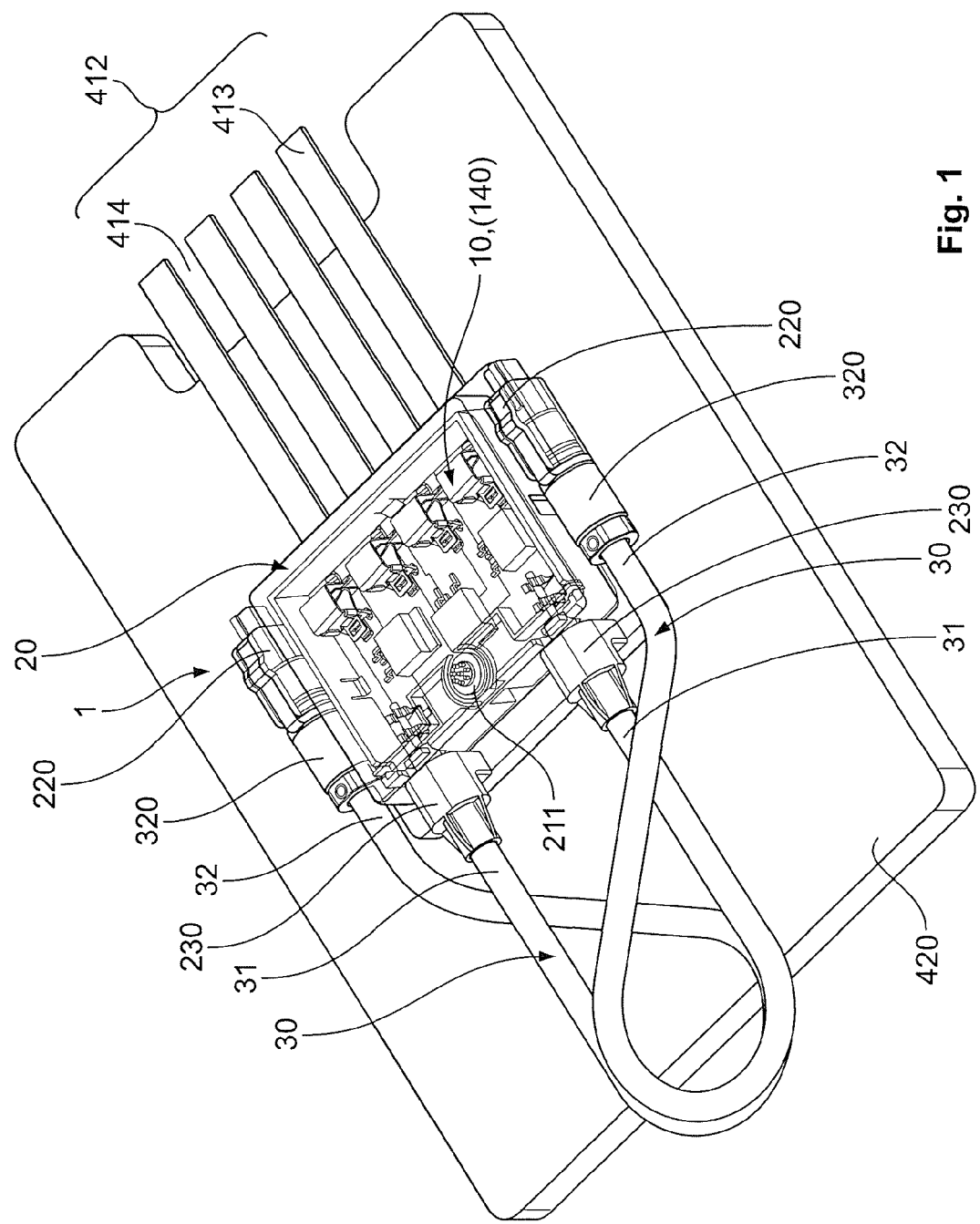

| | | | |
|---|---|---|---|
| 5,679,021 | A | 10/1997 | Kramer |
| 7,134,883 | B2 * | 11/2006 | Werner et al. ................ 439/76.1 |
| 7,507,107 | B2 * | 3/2009 | Tuerschmann et al. ....... 439/441 |
| 7,618,265 | B2 * | 11/2009 | Rueggen et al. ............. 439/76.1 |
| 7,648,403 | B2 * | 1/2010 | Rueggen et al. ............. 439/828 |
| 8,152,536 | B2 * | 4/2012 | Scherer et al. .............. 439/76.1 |
| 2010/0012343 | A1 * | 1/2010 | Ji et al. ...................... 174/50.52 |

OTHER PUBLICATIONS

International Preliminary report on Patentability, issued by the International Bureau of WIPO, Geneva, Switzerland, dated Oct. 9, 2012, for related International Application No. PCT/EP2011/055214; 5 pages.

* cited by examiner

ELECTRIC SPRING TERMINAL UNIT AND ELECTRIC CONNECTING DEVICE

The invention relates to an electrical spring clamping means for an electrical connection device, in particular a connection device for a photovoltaic solar module. Further, the invention relates to an electrical lead frame, an electrical conductor bar and an electrical connection device with a spring clamping means according to the invention, in particular for a photovoltaic solar module.

A photovoltaic solar module, also referred to as a solar panel, typically comprises a plurality of solar cells which convert radiant energy, as a rule in the form of sunlight, directly into electrical energy. On a rear side of a solar module there is usually provided an electrical connection device or connection box, which serves to electrically connect a mating contact element of the solar module, for example connection foils or connection strips which are brought out on the rear side, to electrical connecting cables or connecting lines. A plurality of connection devices and hence solar modules can be interconnected electrically via the connecting cables. For example, serial interconnection of solar modules is conventional in order to achieve the generation of higher electrical voltages. Furthermore, solar modules may be connected via the connecting cables to other devices such as for example inverters. In this case, the connecting cables may be fastened to the housing in the region of a cable end, for example by a cable gland provided on the housing. At an opposite end, the connecting cables are usually provided with a plug-and-socket connector.

In a conventional configuration, an electrical connection device, which is also referred to as a connection box or solar box, comprises a housing with cutouts for passing the electrical contact sections of the mating contact element of the solar module in question through, and a contacting means arranged within the housing for electrically contacting the contact sections. The contacting means comprises for example conductor bars which are connected to clamps, which bars can be electrically connected to the contact sections of the solar module, and to which the above connecting cables or their conductors can also be electrically connected. Further, electrical contacting may take place by welding or via what are called omega springs. Here there is the problem that this electrical contacting has to be set up by a comparatively lengthy process, and the quality of the contacting can later be checked only in an awkward manner.

It is an object of the invention to provide an improved solution for a connection device, in particular for a connection device of a solar module. According to the invention, electrical contacting within the connection device should be able to take place more efficiently than previously, i.e. it should be possible to save time and hence costs in assembling the connection device. Further, the contacting should be able to be established reliably, the invention being intended to permit simple manual or automated electrical contacting. Furthermore, the solution should be simple and robust, the contacting having to remain permanently intact even in the event of high temperature differences. Further, the contacting should have a low electrical contact resistance.

The object of the invention is achieved by means of an electrical spring clamping means for an electrical connection device, in particular a connection device for a photovoltaic solar module, according to claim 1; by means of an electrical lead frame or an electrical conductor bar for an electrical connection device, in particular a connection device for a photovoltaic solar module, according to claim 18; and by means of an electrical connection device, in particular a connection device for a photovoltaic solar module, according to claim 19. Advantageous developments of the invention will become apparent from the dependent claims.

The spring clamping means according to the invention has an electrical contact section and a clamping spring which cooperates therewith. In this case, the clamping spring in its open position is seated under mechanical pre-stress on/in the spring clamping means, the clamping spring preferably being formed such that it can be actuated from outside the spring clamping means proper and can thereby be brought into its closed position. Further, an electrical contact tongue of a mating contact element can be pressed against the contact section by means of the clamping spring in the closed position thereof on the spring clamping means. For this, in the open position of the clamping spring the contact tongue of the mating contact element can be provided in a contact space of the spring clamping means between the contact section and the clamping spring. Instead of being designed for a contact tongue, the spring clamping means may also be configured for non-flat electrical contact sections of electrical conductors.

In the closed position of the preferably electrically conductive clamping spring, the contact tongue is then clamped between the clamping spring and the contact section, the clamping spring being seated on the contact tongue with a clamping section formed thereon under mechanical pre-stress. In this case, the spring clamping means may also be configured such that the clamping spring in its closed position is seated also without contact tongue under pre-stress, then however on the contact section, in order also to be able to clamp thin contact tongues securely. Further, it is preferred for the clamping spring in its closed position likewise to be able to be actuated from outside the spring clamping means proper such that it, e.g. for dismantling purposes, can be brought back into its open position, in which it preferably remains automatically, for which purpose the clamping spring is formed correspondingly.

Due to the application of solar modules on a massive scale, a significant saving of time is obtained when assembling them or when setting up the electrical contactings of the solar modules, since the contactings of the contact tongues of the mating contact element can be set up simply and quickly. Further, defective electrical contactings between solar modules are later reduced. Due to the simple mechanical configuration of the spring clamping means, a robust solution is obtained which remains permanently intact even in the event of high temperature differences, since the clamping spring lies against the contact tongue only under mechanical pre-stress and thus is movable relative to the contact tongue, which further also applies to the contact tongue and the electrical contact section of the spring clamping means.

Due to the fact that the contact tongue can be actuated outside the spring clamping means proper, the arranging of the contacting can take place quickly and simply, manually or also in automated manner, which again has cost advantages compared with the prior art.

In the open position of the clamping spring, the contact space is formed between the clamping spring and the electrical contact section, the electrical contact tongue of the mating contact element being able to be provided substantially free of force in the contact space, i.e. the contact space in the open position of the clamping spring is greater than the contact tongue. In the closed position of the clamping spring, the contact tongue in such case is preferably clamped directly between the clamping spring and the electrical contact section. That is to say that, apart from a bent configuration of the clamping section of the clamping spring, a sandwich-type structure is yielded here. Preferably the contact section is formed on an electrical contact cage of the spring clamping means, the clamping spring likewise being fastened to the contact cage, which spring does not necessarily have to be electrically conductive. In this case, a completely functionally efficient spring clamping means preferably comprises the contact cage and the clamping spring.

The electrical contact section may be provided or formed on a tab, an angled contact or a contact cage or a contact pan. In this case the tab, the angled contact or the contact cage may be connected in one piece, in particular in one piece in terms of material, to a lead frame or a conductor bar. Further, the tab, the angled contact or the contact cage may be formed as a soldered part, in particular as an SMD soldered part. In a preferred embodiment of the invention, the clamping spring is bent over inside the contact cage or in the contact cage, the clamping spring in its longitudinal direction being guided in a bend within the contact cage or in the contact cage. This bend has in a lateral cross-section substantially the form of a triangle, an oval or part of an oval, or of a circle or part of a circle. Further, this cross-section may, at least in regions, be composed of sections thereof, with one or a plurality of rectilinear sections possibly being provided. That is to say that a longitudinal extent of the clamping spring, in particular beginning at its attached longitudinal end section, is rolled up over a more or less large angular range which may be up to over 360°.

Beginning with an attached longitudinal end section of the clamping spring on one side of the contact cage or a free side of the contact cage, the clamping spring extends into the contact cage and defines, with its clamping section and a side located opposite, a first side wall or a front wall of the contact cage on which the electrical contact section is formed, the contact space. Further in the direction of its free longitudinal end section, the clamping spring extends away again from the contact space, in the direction of the side of the contact cage to which it is fixed, or in the direction of the free side of the contact cage. In this case, the free longitudinal end section of the clamping spring protrudes from this side of the contact cage, it being possible for the free longitudinal end section to project through this side or for this side to be an open side of the contact cage. Further, it is possible for this longitudinal end section, depending on an orientation of the contact cage, to extend above or below a free end of the contact cage.

In preferred embodiments, the contact cage is substantially in the form of a pan, the end faces of which are preferably open; that is to say, for example, that the contact cage is in the form of a short channel which is open at the side in each case, which in its main cross-section is e.g. U-shaped or V-shaped. In a first variant of the invention, a first side wall of the contact cage forms the electrical contact section, whereas the clamping spring is fixed on a top wall or a second side wall of the contact cage. In a second variant of the invention, a front wall of the contact cage forms the electrical contact section, whereas the top wall is missing and the clamping spring is fixed between two lateral walls of the contact cage which protrude from the front wall. In both variants, the clamping spring extends, starting from its fastening to the contact cage, in the direction of the contact section. Substantially at one level of the electrical contact section, it has the clamping section by means of which the electrical contact tongue of the mating contact element can be pressed against the contact section.

In preferred embodiments of the invention, the clamping section of the clamping spring between the attached and the free longitudinal end section is formed as a bent section, the attached and the free longitudinal end section of the clamping spring being substantially perpendicular to each other; the clamping spring therefore has virtually a closed loop, i.e. the attached longitudinal end section contacts the free one in an ideal case. The attached longitudinal end section of the clamping spring may have a locking tab protruding from the contact cage or protruding away therefrom, which tab can be engaged in a locking recess of the free longitudinal end section of the clamping spring. The locking tab and the locking recess or the attached and the free longitudinal end section are in this case formed such that, in an engaged state of the locking tab in the locking recess, the open position of the clamping tongue is realised, i.e. the clamping tongue is arranged under mechanical pre-stress on or in the contact cage. Further, the attached longitudinal end section of the clamping spring may have an indentation, e.g. a bead for reinforcement.

In the first variant, the clamping spring may be bent such that the free longitudinal end section of the clamping spring projects through the second side wall of the contact cage or protrudes therefrom. In the second variant of the invention, the free longitudinal end section of the clamping spring may protrude beyond the two lateral walls on an open side of the contact cage, which makes the free longitudinal end section of the clamping spring readily accessible to a tool. In both variants, in the open position of the clamping tongue the locking tab engages in the locking recess, and for the closed position of the clamping tongue the free longitudinal end section is preferably formed such that the locking tab is seated on the free longitudinal end section.

In this case it is preferred for the free longitudinal end section of the clamping spring, in the direction of its free end, adjacent to the locking recess, to have a tool recess into which a tool can be inserted in the closed position of the clamping tongue, by means of which tool the clamping tongue can be brought back into its open position. Preferably the spring clamping means is designed such that in its pre-stressed open position and/or in its electrically contacting closed position it is force-locking in itself such that it does not transmit any forces outwards onto a mounting base or a substrate, such as in particular a printed circuit board, an electrical lead frame or a conductor bar.

In one embodiment of the invention, the electrical spring clamping means is formed as a component suitable for a printed circuit board, in particular as an SMD-capable component (SMD=surface-mounted device). For this, on a free longitudinal end of the first and/or the second side wall of the contact cage, at least one electrical contact tab which protrudes away therefrom, in particular which protrudes away laterally therefrom, is provided, which tab can be soldered to a printed conductor of the printed circuit board. In another embodiment of the invention, the contact cage of the spring clamping means is part of an electrical lead frame or an electrical conductor bar. In such case, the lead frame or the conductor bar may be encapsulated and e.g. already in this form may be a housing part, in particular a lower housing, for the electrical connection device.

In the first variant of the invention, the clamping spring is preferably fastened internally to the contact cage surface-to-surface with its attached longitudinal end section, the appropriate sections in this region forming a sandwich-type structure and possibly being fastened to each other e.g. by a spot weld or by gluing. In contrast to this, in the second variant of the invention it is preferred for the clamping spring to be able to be inserted into the contact cage, preferably between the two lateral walls. In this case, the attached longitudinal end section is preferably fastened by means of a tab in a recess of the contact cage, the contact cage further possibly having on the recess a folded edge which additionally locks the tab in the recess.

In both variants of the invention, the clamping spring may have in the region of its clamping section one or a plurality of, in particular two, three or four, longitudinal slots extending in its longitudinal direction, preferably formed as through-slots. The longitudinal slot in question may in this case extend away from the clamping section in the direction of the free longitudinal end section and of the attached longitudinal end section of the clamping spring in both longitudinal directions of the clamping spring. In embodiments, the longitudinal slot in question may begin adjacent to or on the attached longitudinal end section of the clamping spring, extend across the clamping section and end adjacent to the locking recess in the clamping spring.

Figure 2:
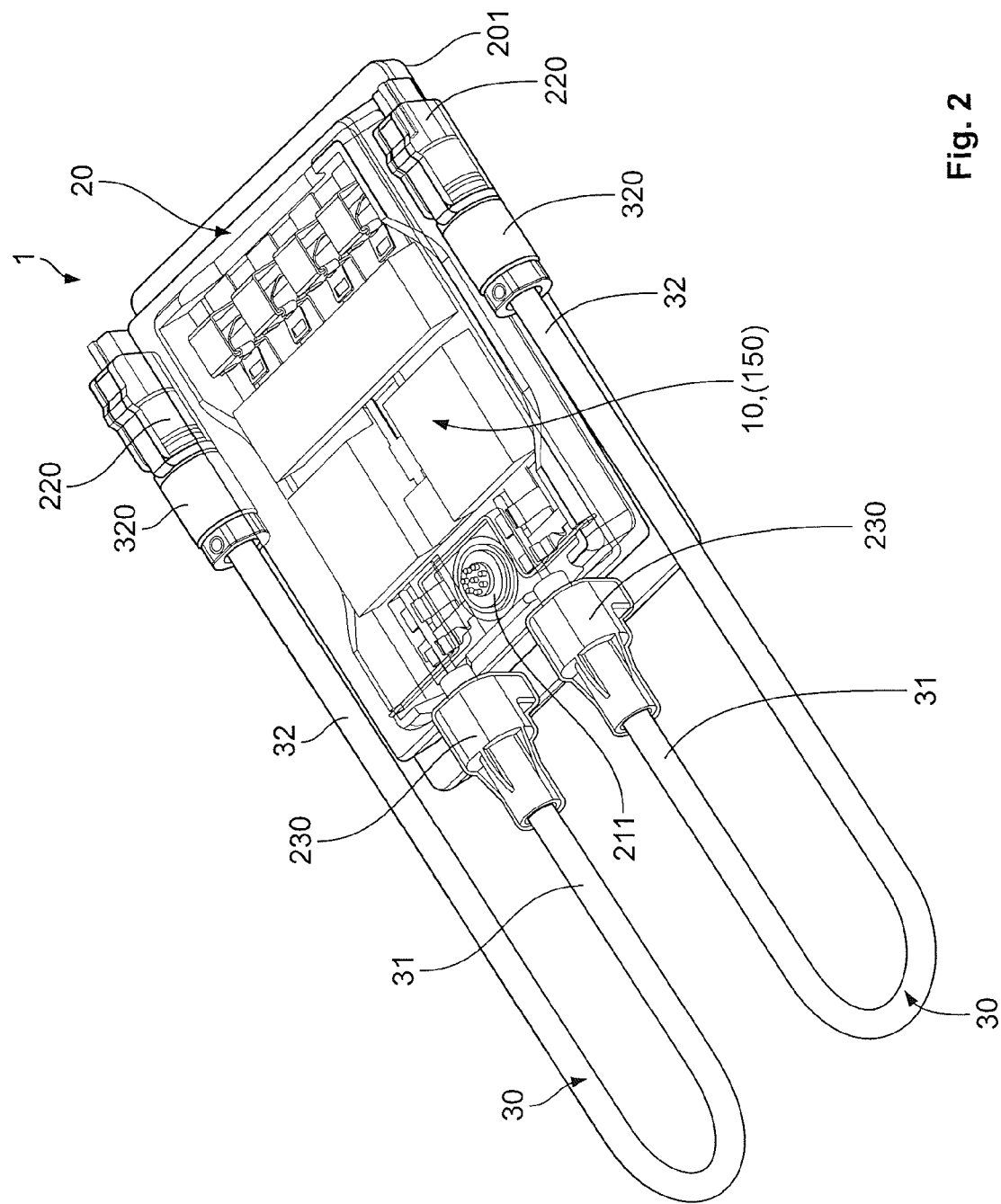
Figure 3:
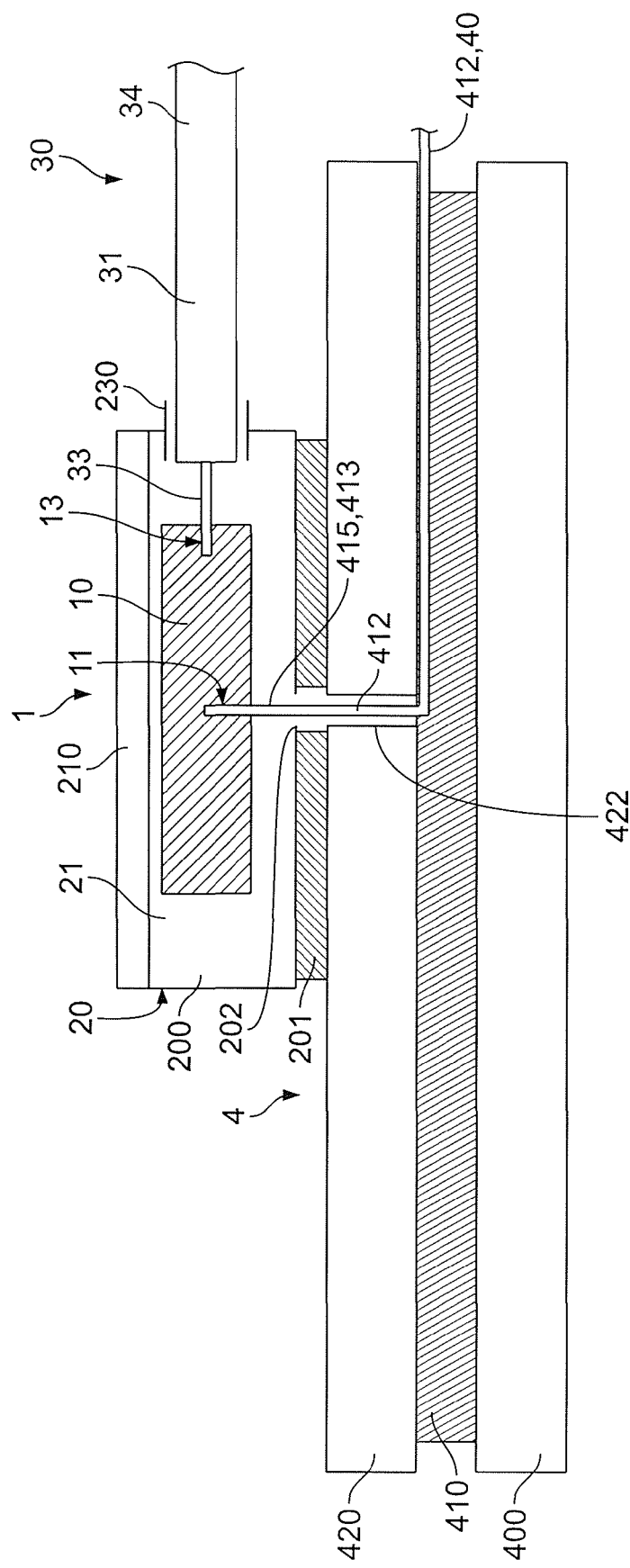
Figure 4:
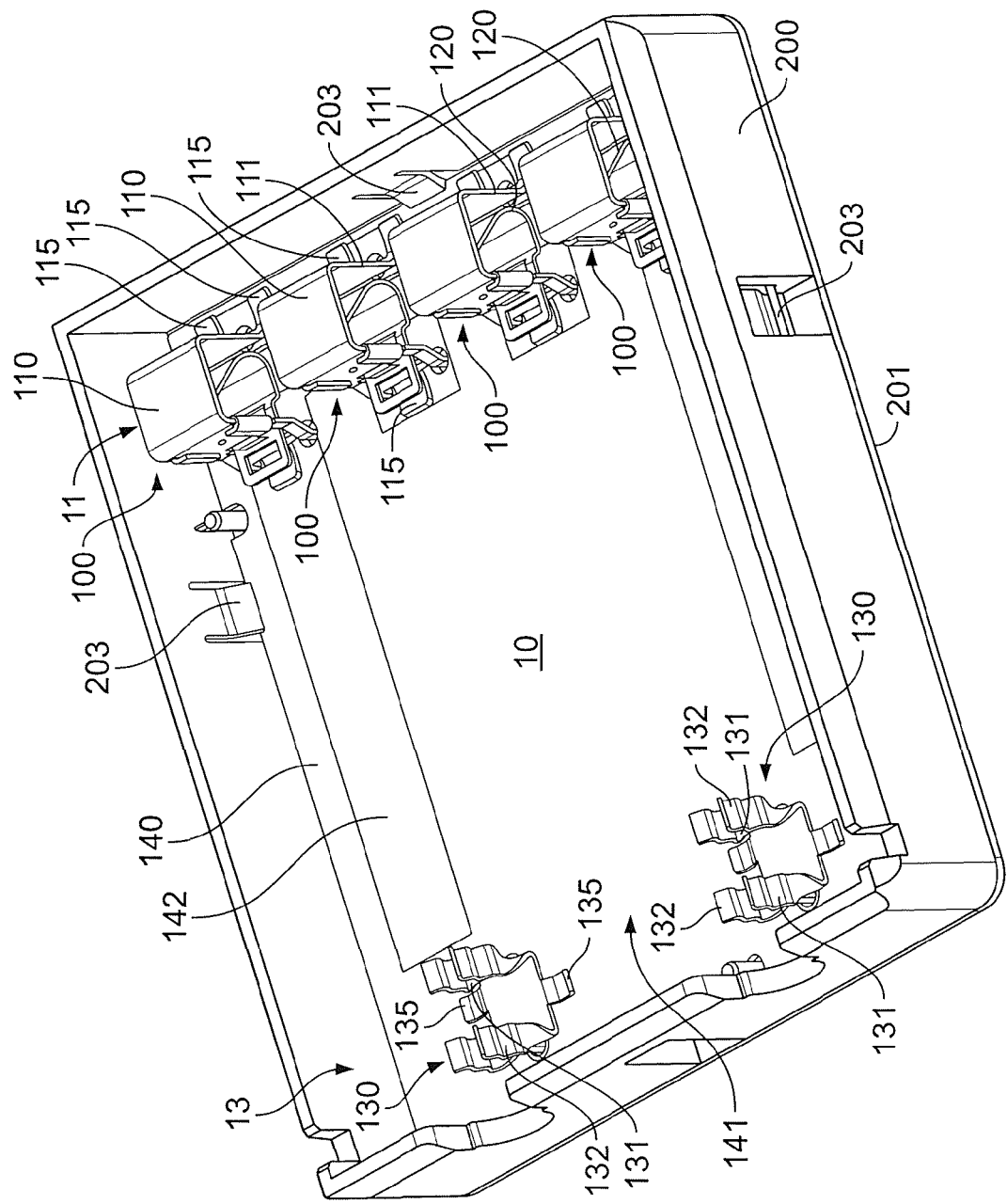
Figure 5:
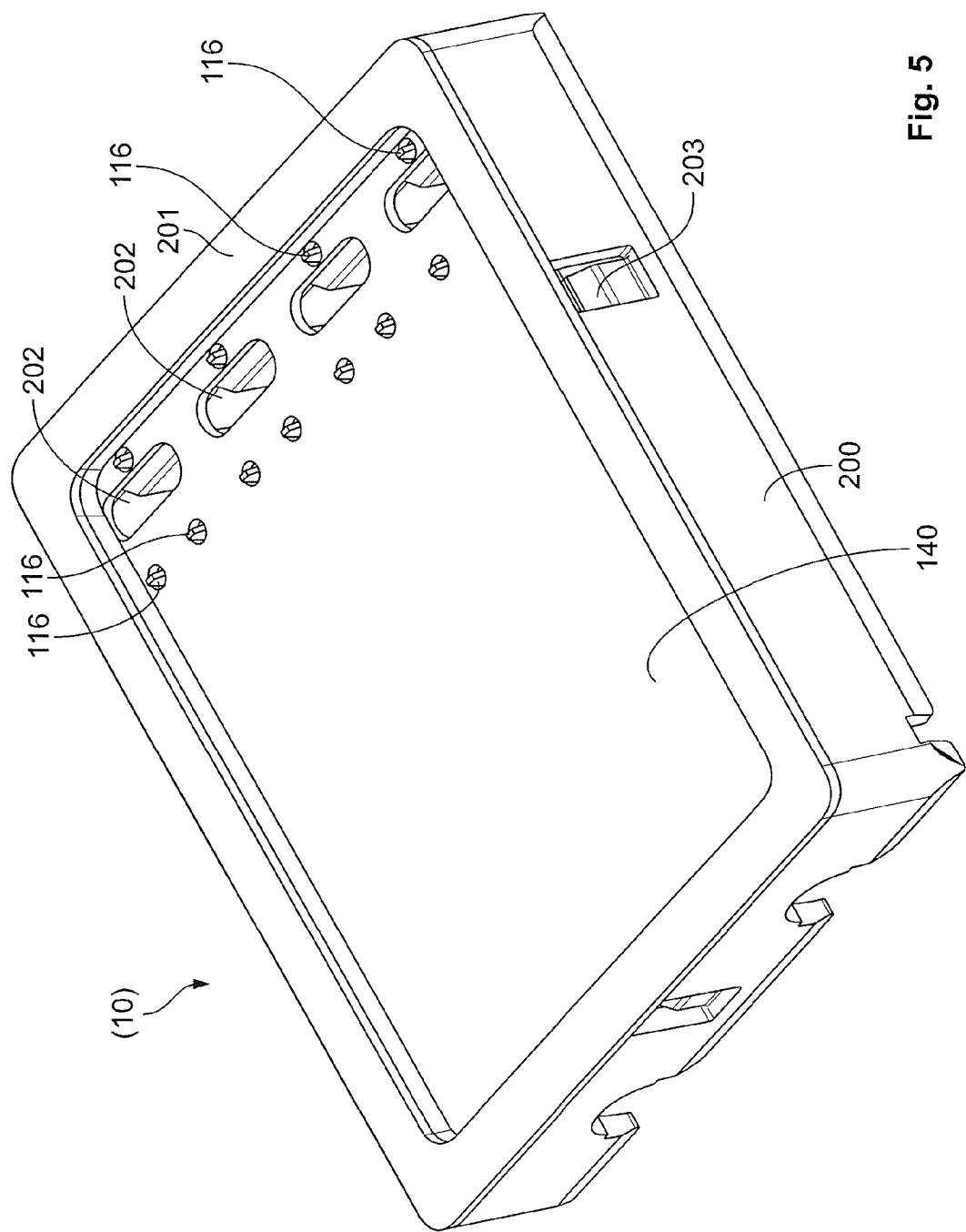
Figure 6:
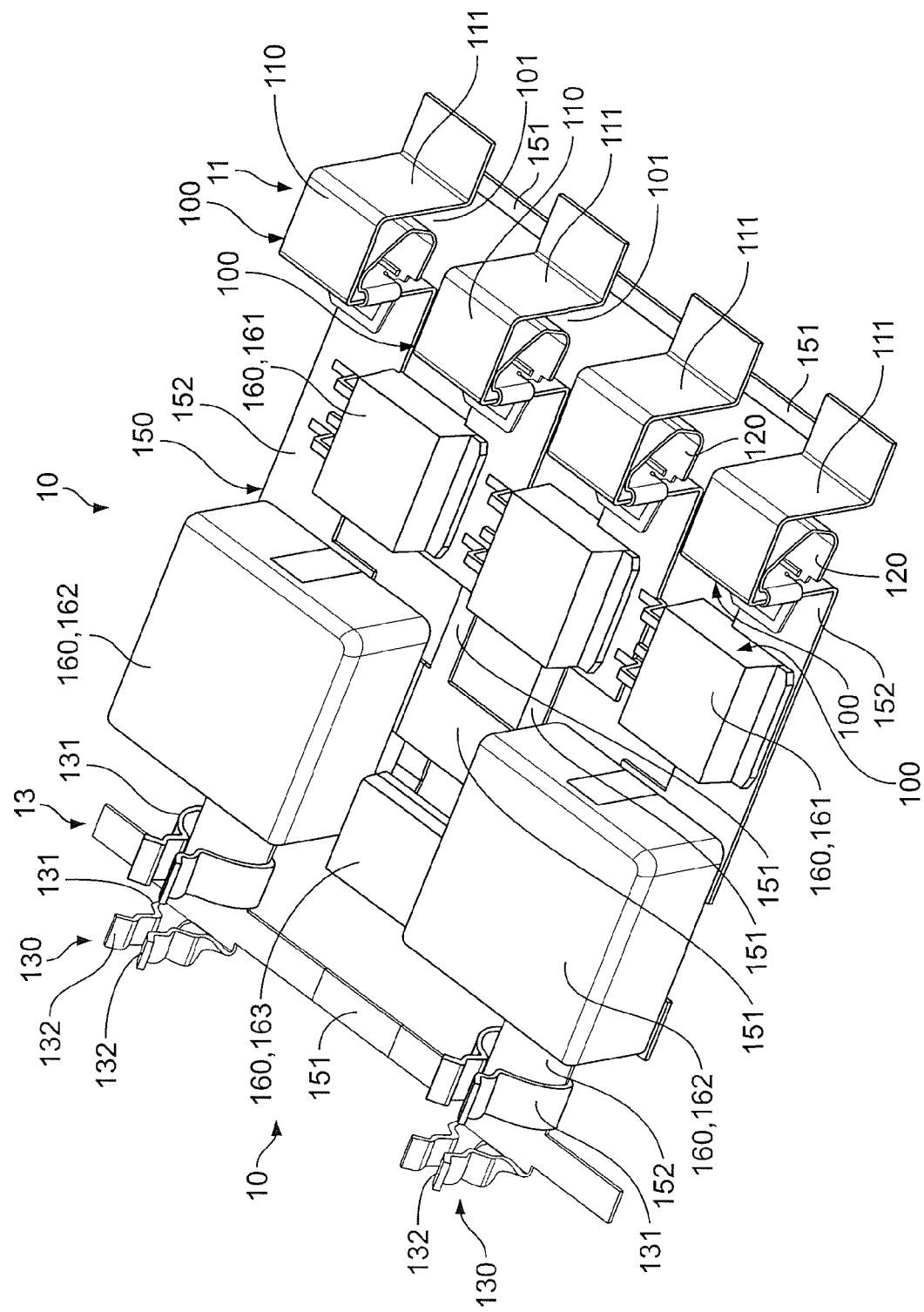
Figure 7:
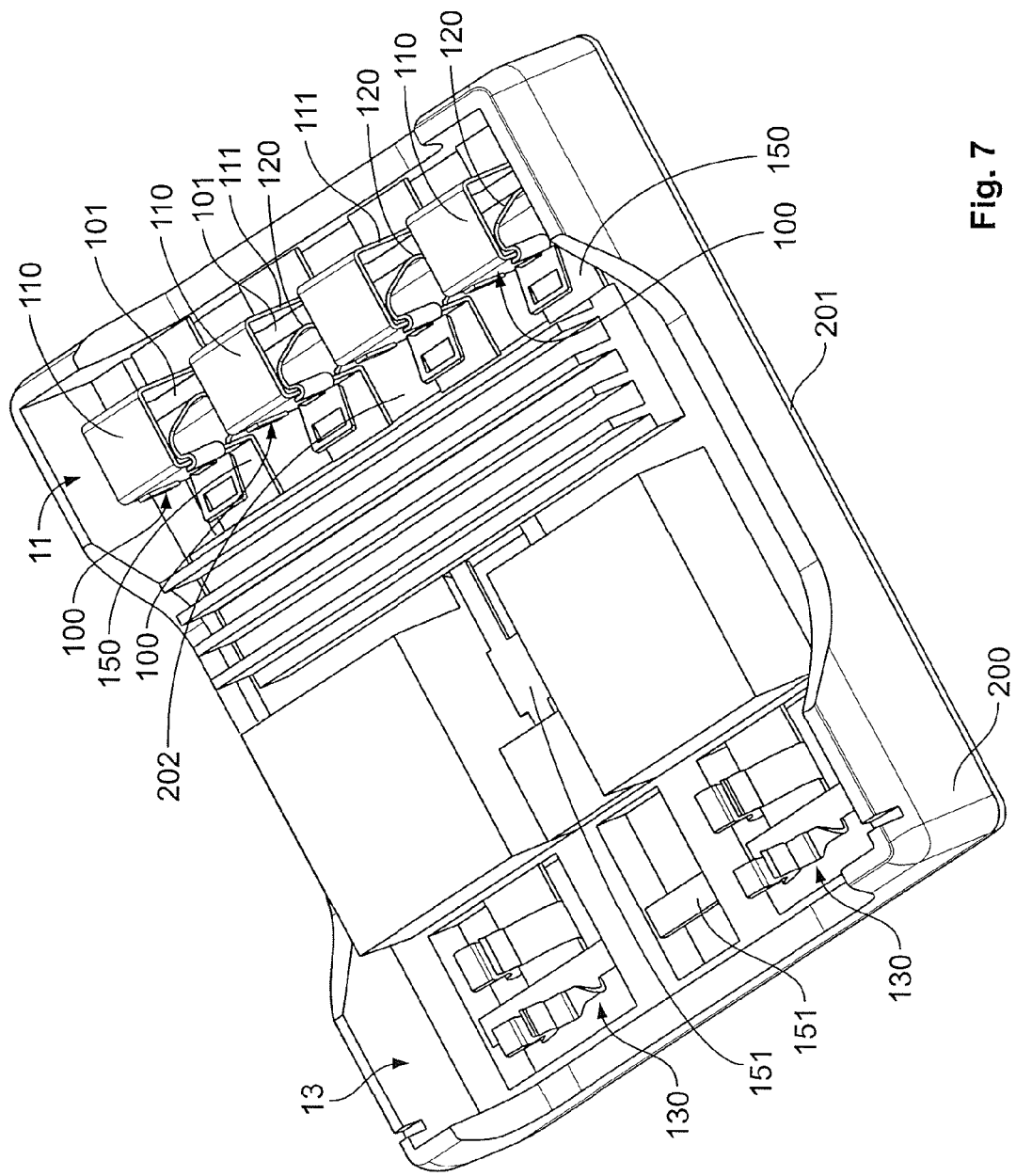
Figure 8:
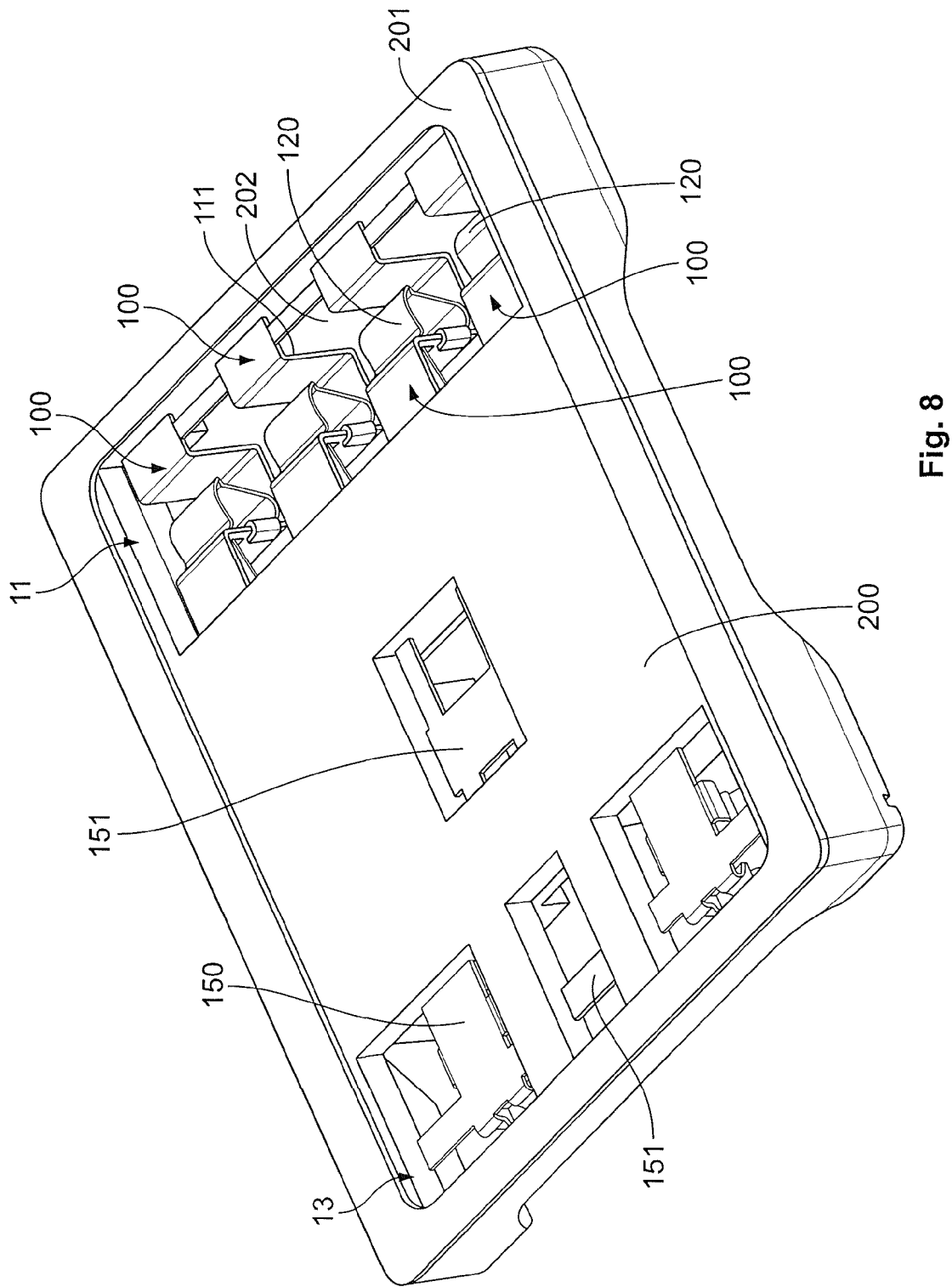
Figure 9:
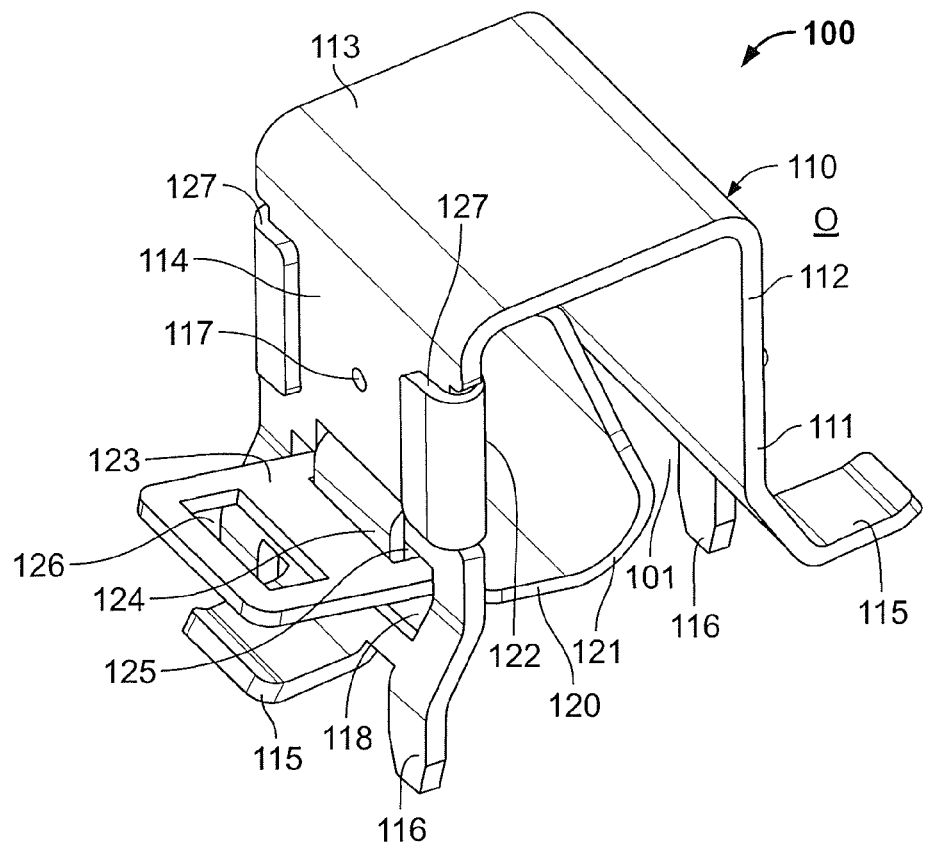
Figure 10:
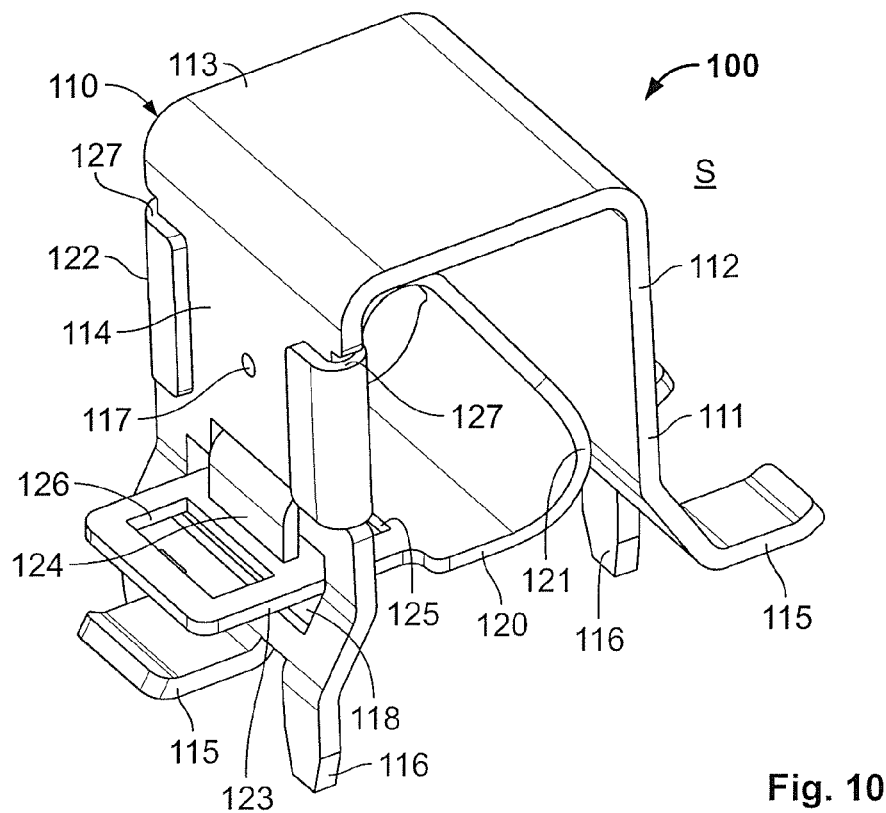
Figure 11:
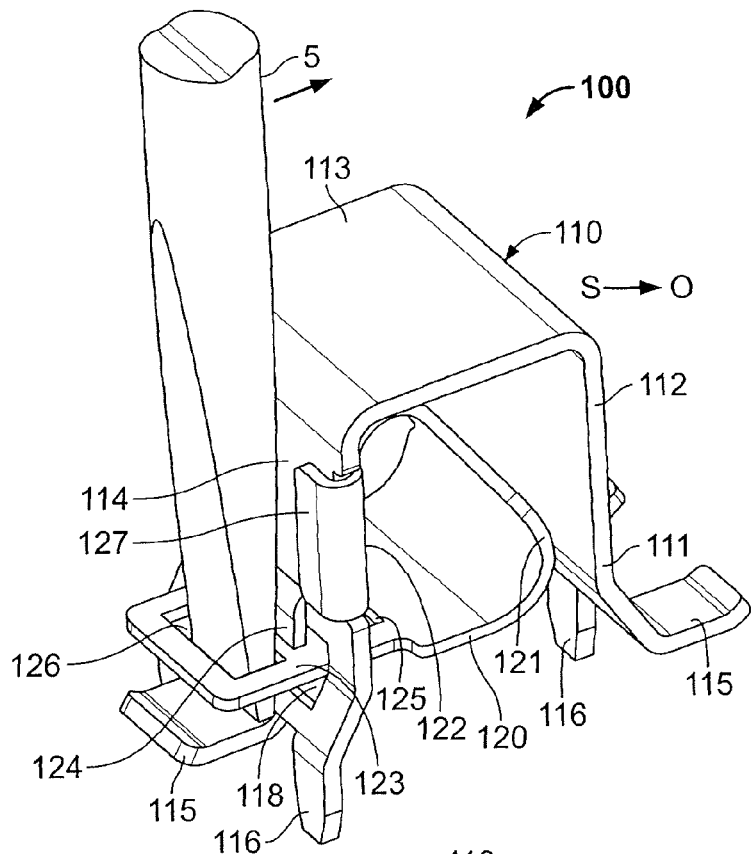
Figure 12:
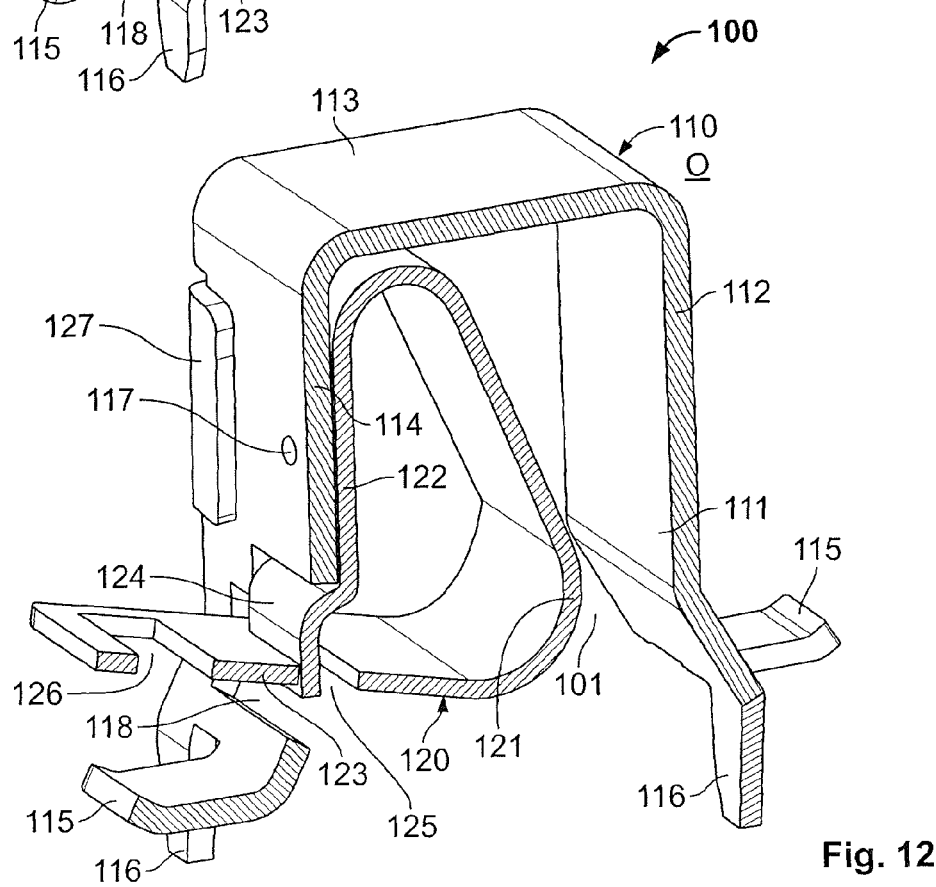
Figure 13:
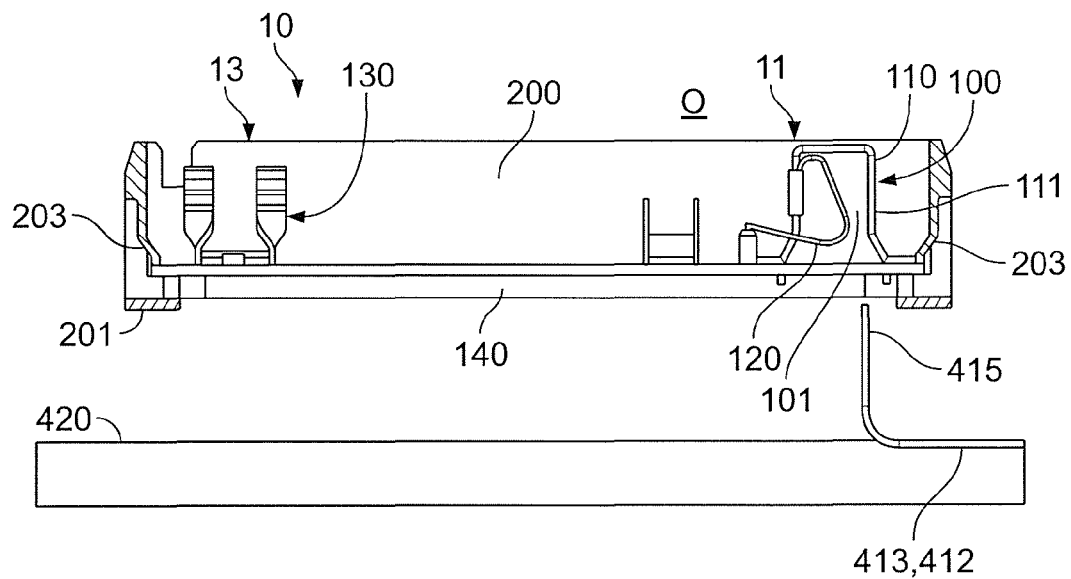
Figure 14:
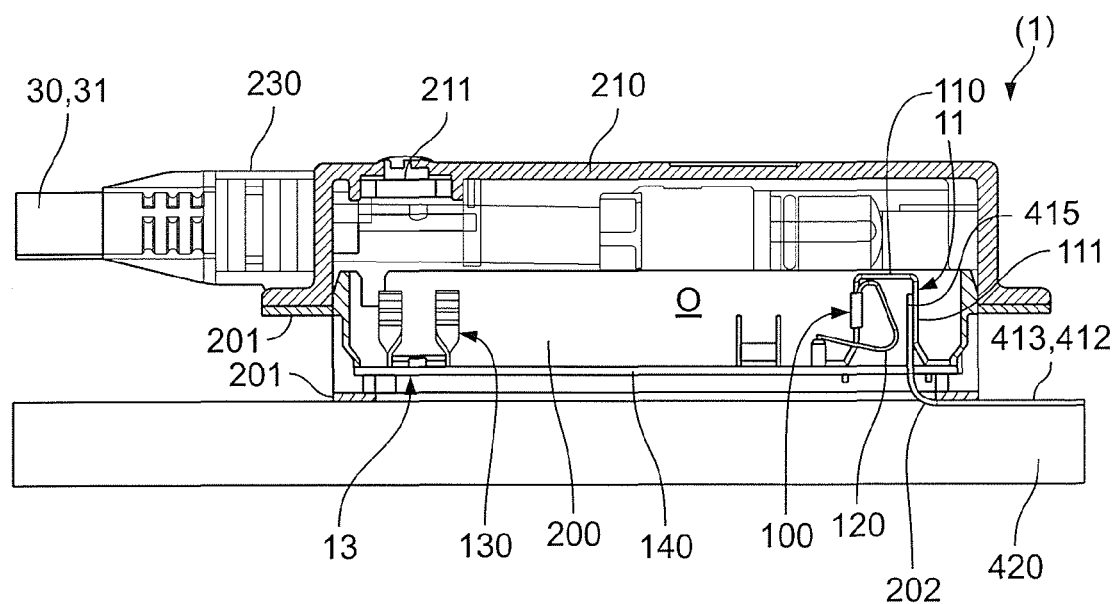
Figure 16:
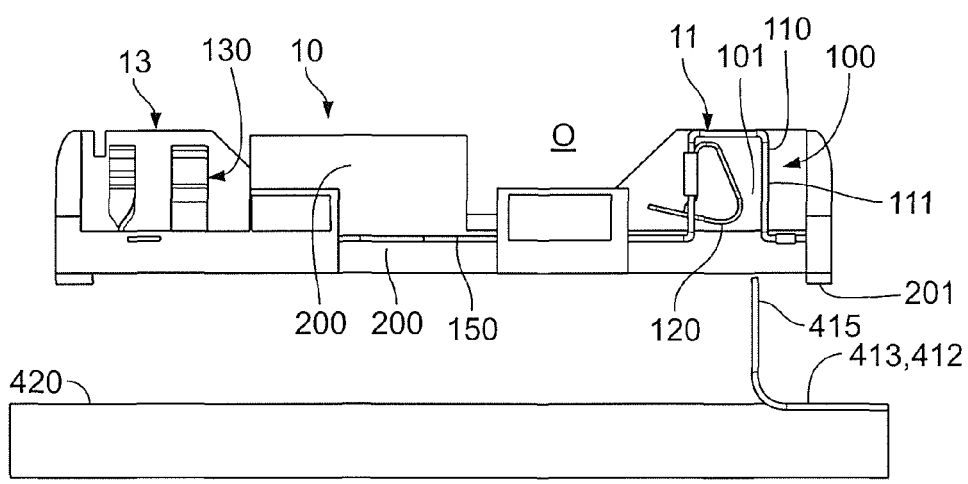
Figure 17:
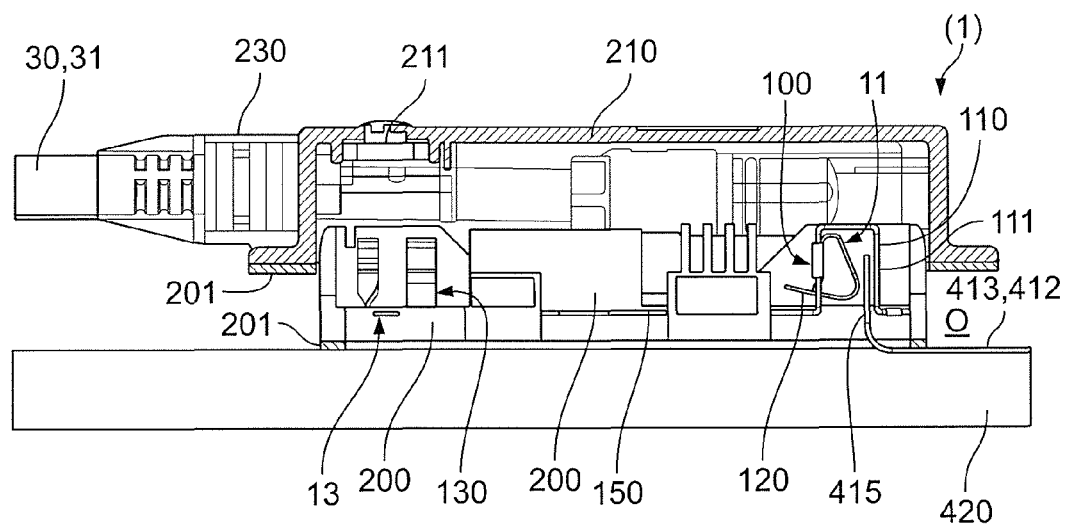
Figure 18:
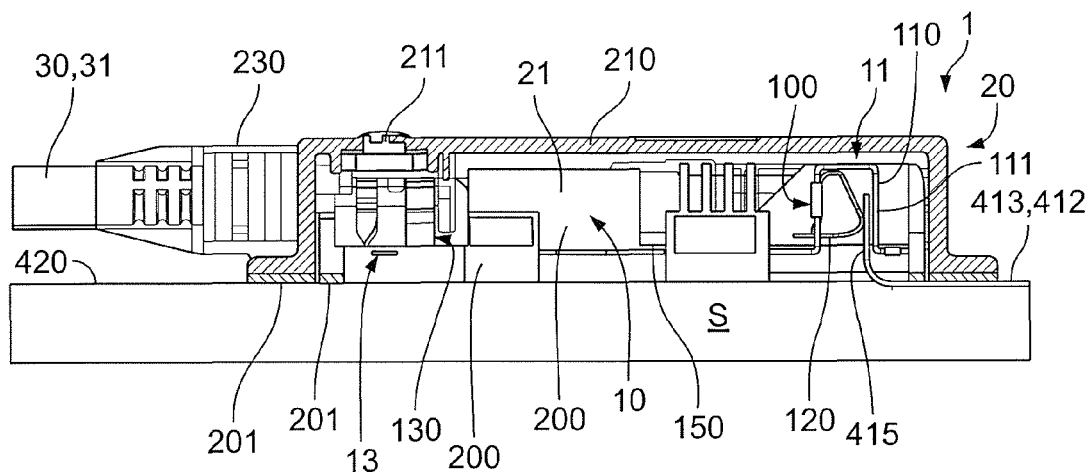
Figure 19:
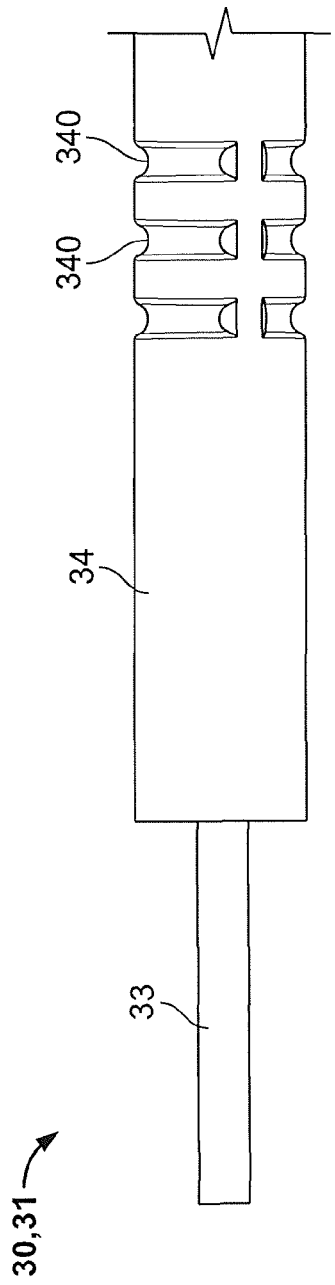
Figure 20:
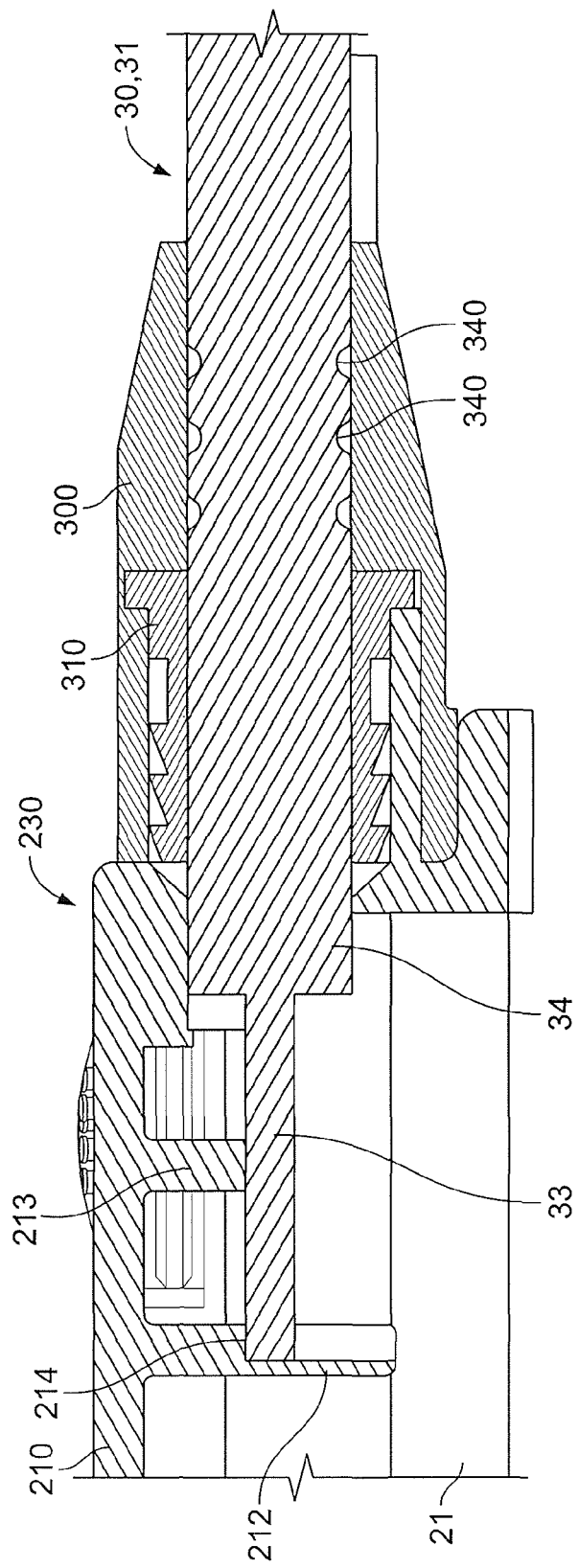
Figure 21:
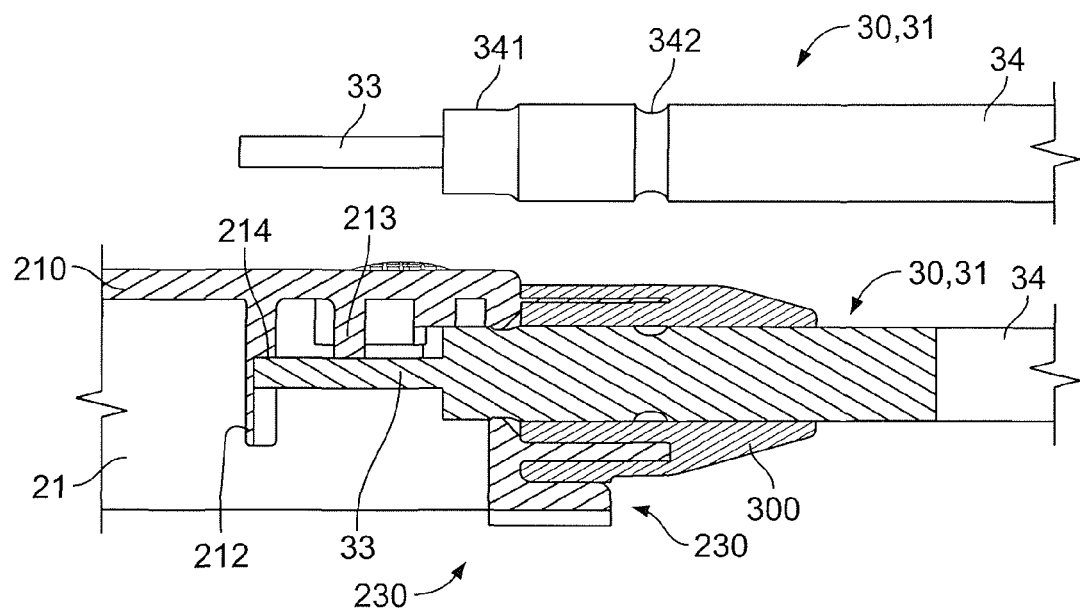
Figure 22:
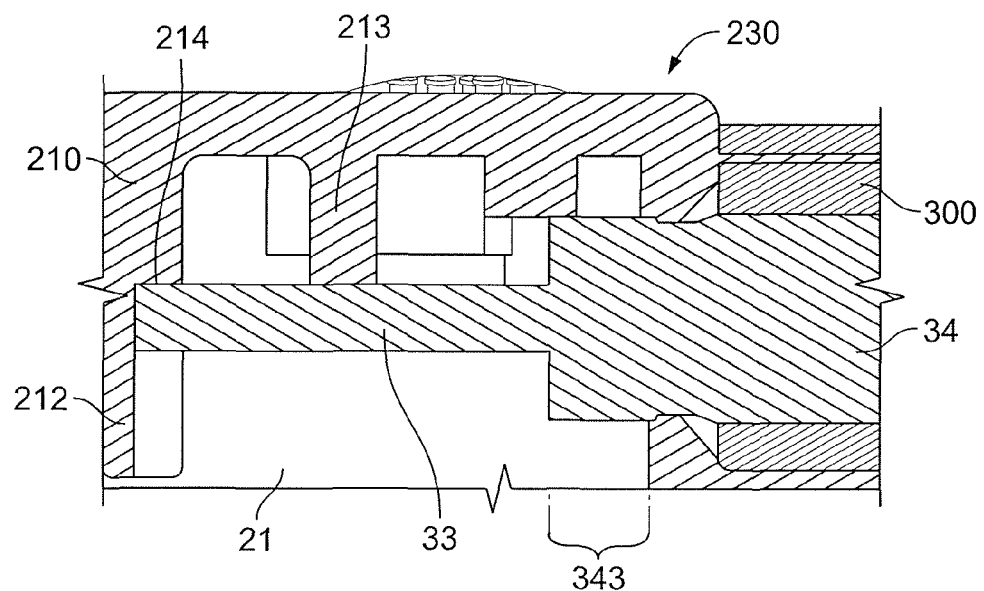
Figure 23:
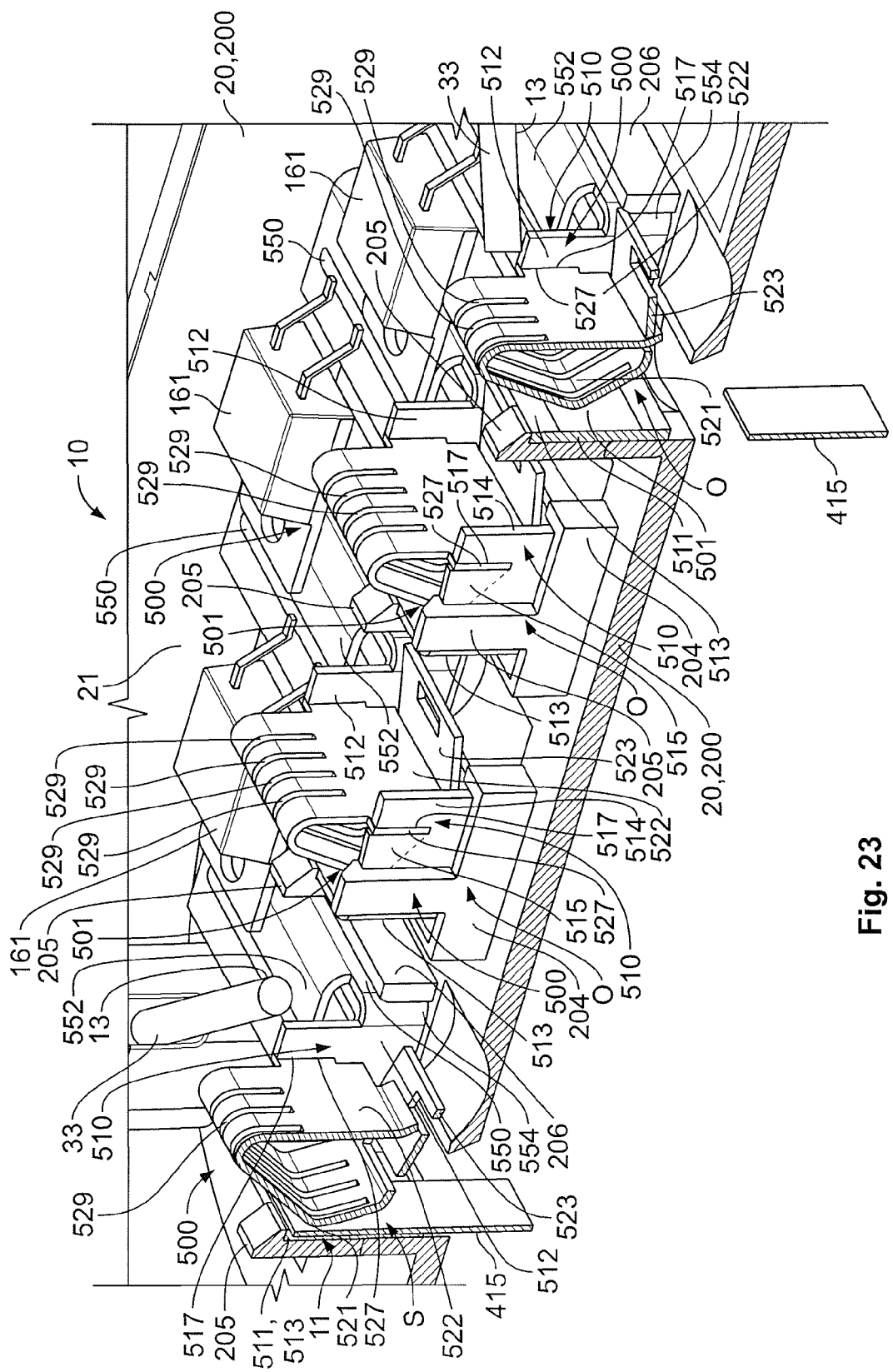
Figure 24:
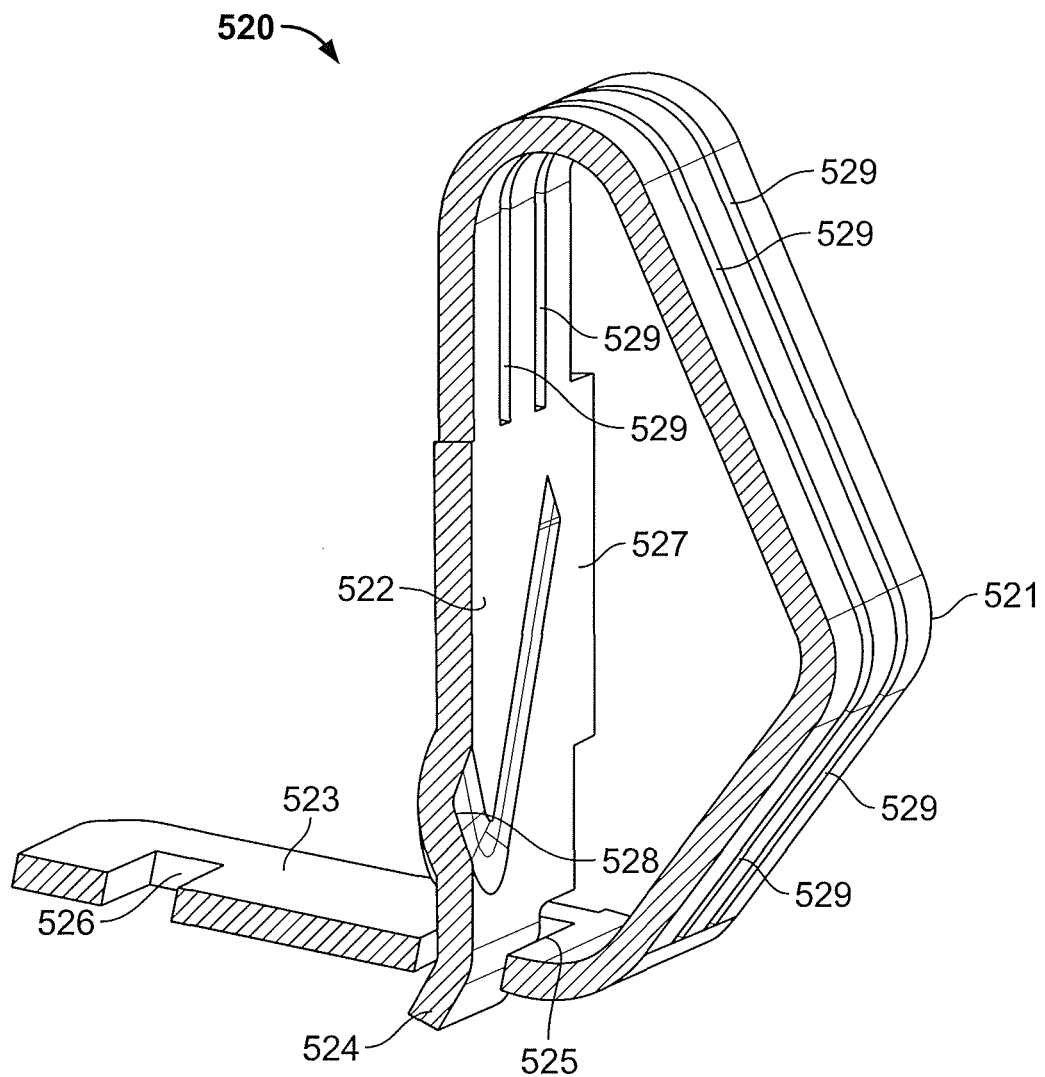
Figure 25:
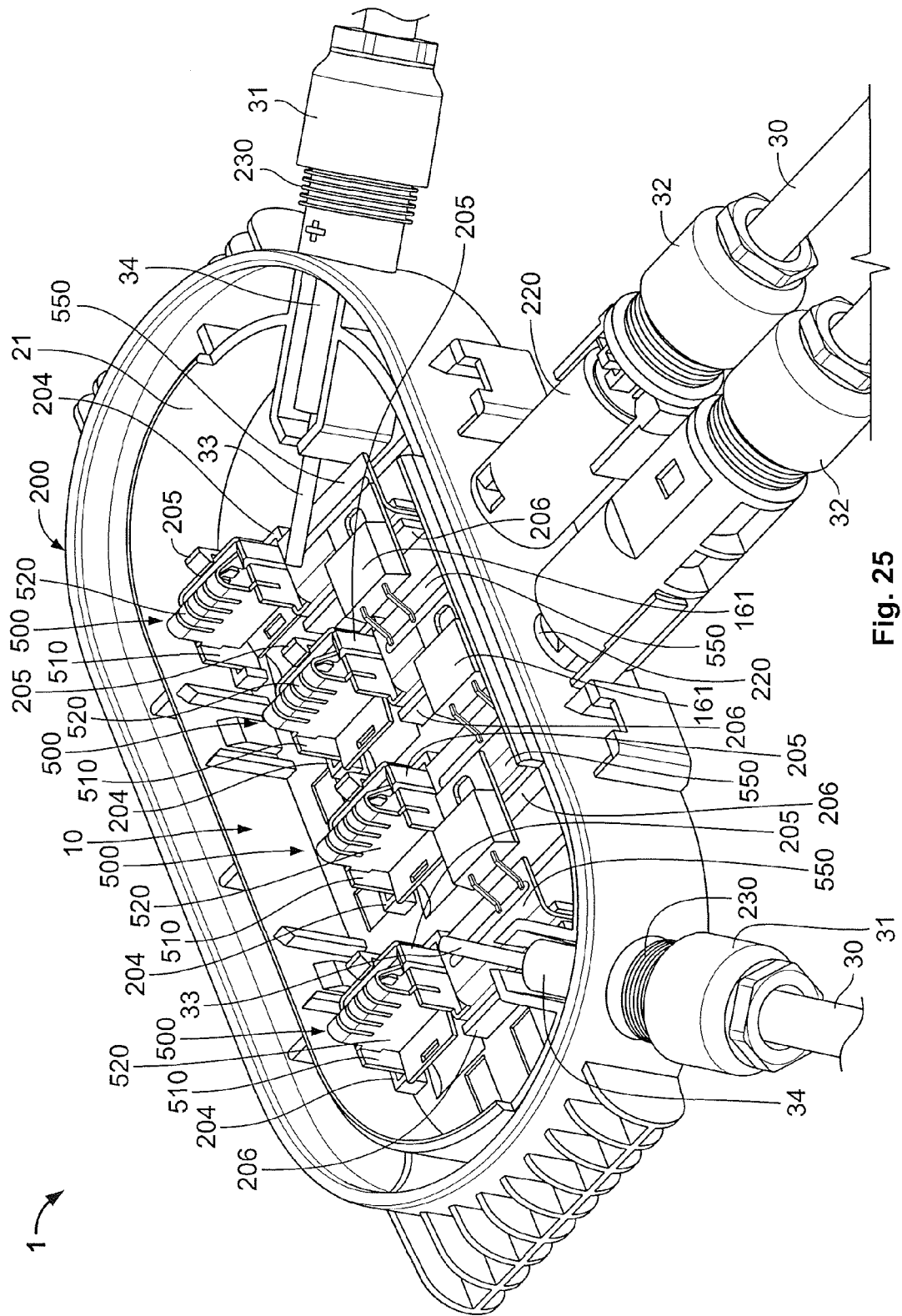
Figure 26:
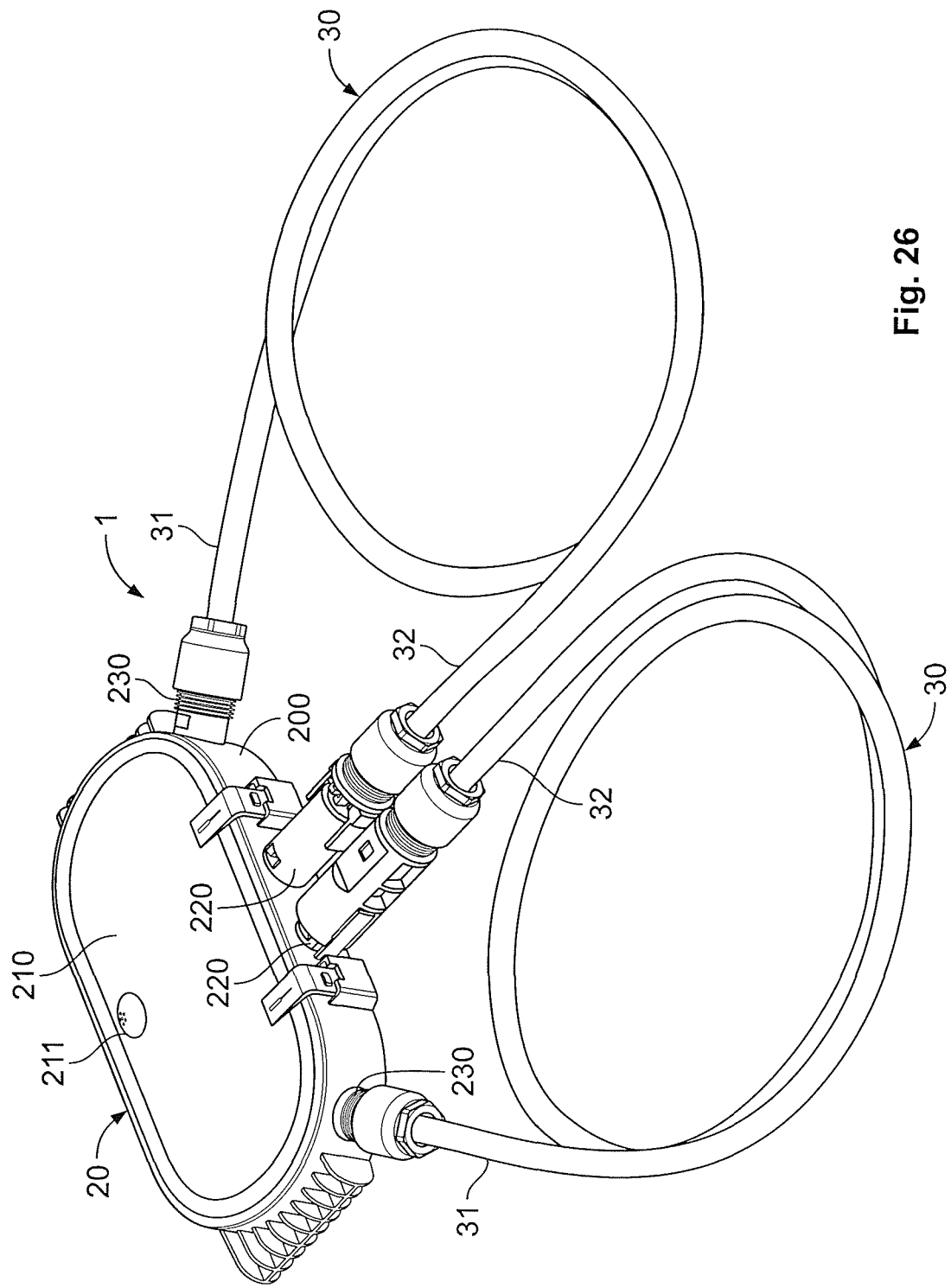
Figure 27:
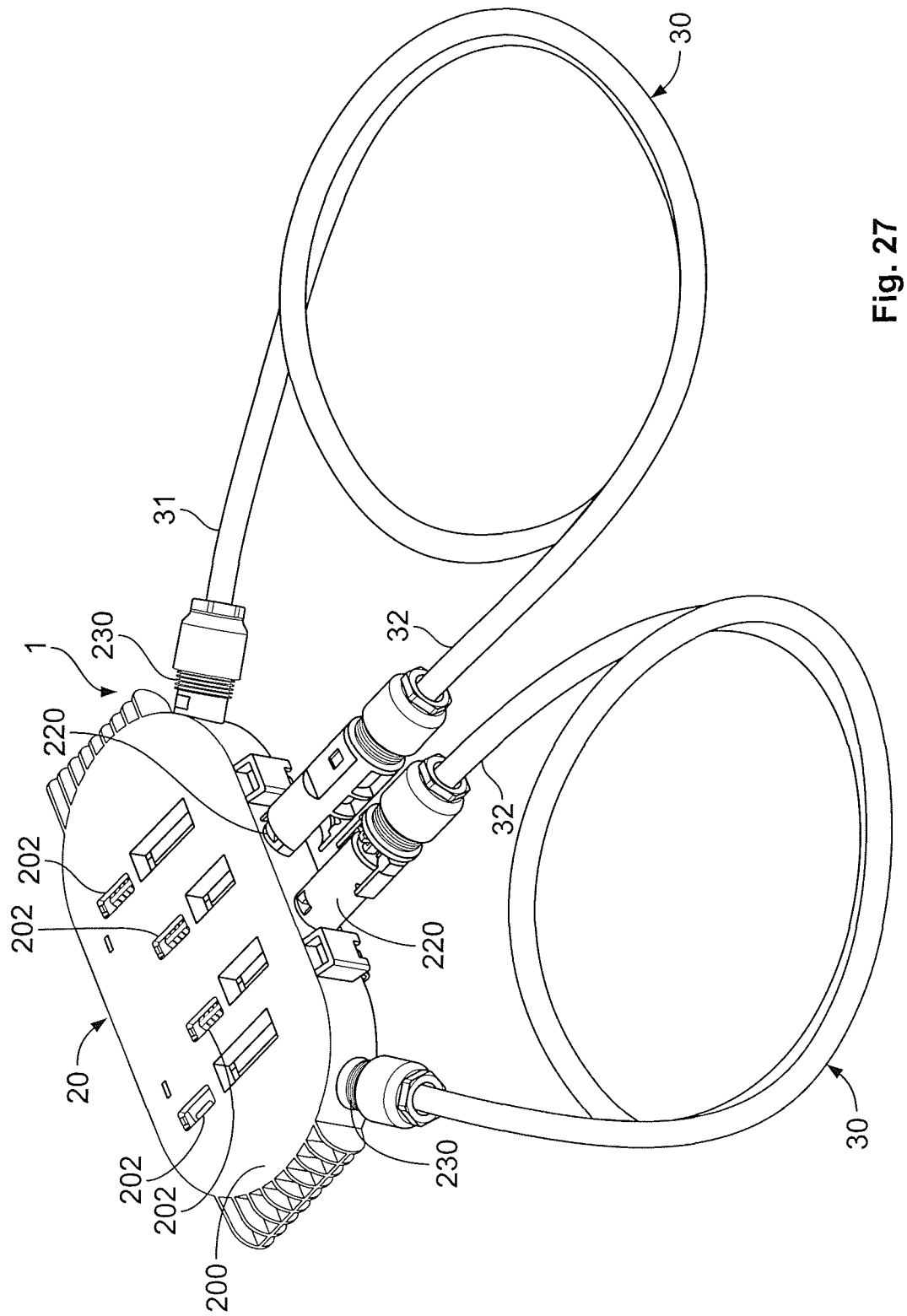

The invention will be explained in greater detail below using examples of embodiment of two variants of the invention with reference to the appended drawings. In this case, FIGS. 9 to 12 relate to the first, and FIGS. 23 and 24 to the second, variant of the invention. The other figures of the drawings may relate to both variants of the invention, although in each case only one individual embodiment of a variant is illustrated. The drawings depict:

FIG. 1 a perspective view of a first embodiment of an electrical connection device according to the invention for a photovoltaic solar module with connecting cables provided thereon;

FIG. 2 likewise a perspective view in which a second embodiment of the connection device according to the invention is shown;

FIG. 3 a diagrammatic lateral sectional view of a solar module with a solar box mounted on the solar module, which box is formed as a connection device according to the invention;

FIG. 4 in a perspective view, a first embodiment of a contacting means with electrical spring clamping means according to the invention from above;

FIG. 5 a perspective view of the electrical contacting means according to the invention of FIG. 4 from below;

FIG. 6 in a perspective view, a second embodiment of the contacting means with electrical spring clamping means according to the invention from above;

FIG. 7 a view analogous to FIG. 6 of the electrical contacting means in an encapsulated state;

FIG. 8 a perspective view of the contacting means according to the invention of FIG. 7 from below;

FIG. 9 a perspective view of an embodiment of the first variant of a spring clamping means according to the invention in the open position thereof;

FIG. 10 the electrical spring clamping means of FIG. 9 in a closed position of its clamping spring;

FIG. 11 the spring clamping means of FIG. 10 upon converting the clamping spring from the closed position thereof into the open position thereof with the aid of a tool;

FIG. 12 the electrical spring clamping means of FIG. 9 in a sectional view;

FIG. 13 in a lateral sectional view, a first assembly step of the first embodiment of the connection device to/on a solar module;

FIG. 14 a further assembly step of the connection device according to the invention in a view analogous to FIG. 13;

FIG. 15 likewise again in a lateral sectional view, a final assembly step of the first embodiment of the connection device;

FIG. 16 in a lateral sectional view, a first assembly step of the second embodiment of the connection device to/on a solar module;

FIG. 17 a further assembly step of the connection device according to the invention in a view analogous to FIG. 16;

FIG. 18 likewise again in a lateral sectional view, a final assembly step of the second embodiment of the connection device;

FIG. 19 in a side view, a stripped end section of a first embodiment of a connecting cable for the connection device according to the invention;

FIG. 20 a sectional side view of a section of a housing part of the connection device, with the connecting cable of FIG. 19 mounted thereon;

FIG. 21 in a side view, a stripped end section of a second embodiment of the connecting cable, and in a sectional side view a section of a housing part of the connection device with the connecting cable mounted thereon;

FIG. 22 a detail view of FIG. 21 in the region of the connecting cable mounted on the housing part;

FIG. 23 a laterally sectional, perspective view of a third embodiment of the connection device with an embodiment of the second variant of the spring clamping means according to the invention;

FIG. 24 a perspective view of a laterally sectional clamping spring for the spring clamping means of FIG. 23;

FIG. 25 a perspective view of the third embodiment of the electrical connection device according to the invention for a photovoltaic solar module without a cover, from above;

FIG. 26 a perspective view from above of the third embodiment of the connection device with connecting cables provided thereon; and FIG. 27 a perspective view from below of the connection device of FIG. 26.

The invention will be explained in greater detail below with reference to three embodiments of connection devices according to the invention, with on one hand the connection device and on the other hand an electrical contact means of the connection device, which will be explained in greater detail using two variants of the invention and in the present case is formed as a spring clamping means, being the subject of the invention. In this case, the spring clamping means according to the invention in the drawings is formed such that it can electrically contact a two-dimensional electrical contact tongue of a mating contact element; in other embodiments of the invention, the spring clamping means may however also be formed so as to receive other contact sections of electrical conductors or connecting cables, such as approximately cylindrical or markedly rectangular cross-sections. Further, the invention will be explained in greater detail below in its application to solar technology, but it is of course possible also to apply the invention to other fields, such as electrical engineering in general.

The individual features of the two variants or embodiments of the spring clamping means or the individual features of the three embodiments of the connection devices in this case are not restricted to the variants or embodiments in question. That is to say that a feature which is explained with regard to one embodiment can also be transferred to other embodiments. Thus it is e.g. possible to apply both variants of the spring clamping means to all three embodiments of the connection devices. Further, it is e.g. possible to adapt both variants of the spring clamping means to a printed circuit board, a lead frame or a conductor bar. Furthermore, in all three embodiments a housing part, in particular a lower housing, may be formed as a contacting means, i.e. a separate contacting means is omitted.

FIGS. 1, 2 & 26 each show an external view of an embodiment of an electrical connection device 1 which is shown in FIG. 3 as a diagrammatic lateral sectional view together with a photovoltaic solar module 4 or solar panel 4, the solar module 4 being electrically contacted by the connection device 1 in FIG. 3. The solar module 4 preferably comprises a sandwich structure with a front or radiation-side transparent layer 400 and a rear-side layer 420, between which at least one solar cell 410 is arranged. The two layers 400, 420 may for example be panes of glass, or alternatively layers 400, 420 or sheets made of other materials, in particular plastics materials. In addition to these components, the solar module 4 may have further components (not shown), such as a (transparent) embedding layer or adhesive layer arranged between the layers 400, 420, and/or a frame surrounding the sandwich structure 400, 410, 420.

A solar cell 410 generates electrical energy when irradiated with electromagnetic radiation, in particular sunlight. In order to tap off or discharge the energy, i.e. the voltage or the current generated, and to electrically interconnect a plurality of solar cells 410, the solar module 4 has a conductor system which comprises an electrical (mating) contact element 412 on the rear side of the solar module 4 or merges into the mating contact element 412. In FIG. 3 there is illustrated by way of example a mating contact element 412 which is e.g. in the form of a connection foil 412 or a connection strip 412, and for example can be passed through an inlet opening 422 in the rear-side layer 420 and emerges on or across the layer 420. It is also possible electrically to interconnect the solar cells 410 of the solar module 4 internally and only to carry out electrical onward interconnection by means of the connection device 1.

The connection device 1, which may also be referred to as a connection box 1 or solar box 1, is used to electrically contact the conductors 413 or flat conductors 413 of the mating contact element 412 and further to connect them electrically to corresponding connecting cables 30, of which only one is illustrated in FIG. 3. The connection device 1 has a housing 20 which is made for example from a plastics material. The housing 20 surrounds an inner chamber 21 and may, as illustrated in FIG. 3, be fastened to the solar module 4 for example with the aid of adhesive 201 or a tape 201. The housing 20 has, on a side located opposite the solar module 4, one or more housing openings 202 through which an electrical contact section 415, such as for example a contact tongue 415, of the mating contact element 412 or of the solar module 4 can be introduced into the inner chamber 21 of the connection device 1. In this case, the housing openings 202 may be provided in a printed circuit board 140 (see below and FIG. 5), in an encapsulation 200 (see below and FIG. 8), a lower housing 200 (see below and FIG. 27) or another housing part (not shown in the drawings).

The connection device 1 comprises a means 10, arranged in the inner chamber 21 of the housing 20, for contacting the electrical contact sections 415 and for electrical onward connection thereof, which will be referred to below as contacting means 10. In the third embodiment of the connection device 1, the contacting means 10 is omitted; in this case, the lower housing 200 is formed as the contacting means 10. Mounting of the connection device 1 or constituents thereof (contacting means 10, lower housing 200, upper housing 210 or cover 210) on the solar module 4 and arrangement of an electrical connection between the contact sections 415 and the contacting means 10 or a component thereof may take place in each case manually and/or automatically (see below). For automated mounting, the housing part in question preferably has a smooth, in particular polished, surface, so that a suction gripper can act thereon.

Furthermore, an electrical connection between the contact sections 415 and the electrical connecting cables 30, of which preferably two are present, is produced via the contacting means 10 or the lower housing 200. For this, the connection device 1 has a connector 230 on the housing 20 for each of the connecting cables 30, the connector 230 having an opening for passing the connecting cable 30 through into the inner chamber 21 and in the mounted state of the connection device 1 to the contacting means 10 or into the lower housing 200. A connector 230 may be realised on the housing 20 in the form of a cable gland (see below and FIGS. 25-27) or another fastening, such as an encapsulated fastening (see below and FIGS. 20-22). Further, the connection device 1 has, preferably on its upper housing 210 or cover 210, a membrane 211 or a diaphragm 211, in particular made of plastics material, preferably of Gore-Tex® or Nafion®, by means of which the inner chamber 21 can be dehumidified and a pressure compensation realised.

FIGS. 4 & 5 show the first embodiment of the contacting means 10 in a lower housing 200 without an upper housing 210 or a cover 210 (see below), the lower housing 200 assuming the contacting and onward interconnection of the electrical contact section 415 or of the contact tongue 415 of the mating contact element 412 or of the solar module 4. Further, the lower housing 200 provides contact means 130 which serve for electrical contacting 13 of the connecting cables 30 or their conductors 33. For this, the lower housing 200 has a printed circuit board 140 or board 140 as contacting means 10 proper, which may be populated with electrical or electronic components, such as a diode, a choke, a varistor and the like.

In this case, the printed circuit board 140 preferably has a free space 141 which is initially not yet used for later extensions and adaptations of its functionality; this is e.g. an ESD protector (ESD=electrostatic discharge), an overvoltage protector, an inverter, a power control or regulation, or alternatively an anti-theft device. That is to say that the printed circuit board 140 is preferably oversized in order to be able to be modified for future functions on the solar module 4 without having to redesign the rest of the connection device 1 in so doing. Matched correspondingly to the printed circuit board 140, the lower housing 200, the cover 210 thereof and hence the connection device 1 are correspondingly oversized.

For electrical contacting 11 of the mating contact element 412 of the solar cell(s) 420, the printed circuit board 140 has electrical contact means 100 which are mounted thereon, which are preferably formed as spring clamping means 100. The spring clamping means 100 will be explained in greater detail further below with reference to FIGS. 9-12 and FIGS. 23 & 24. In order that the electrical contact sections 415 or contact tongues 415 of the mating contact element 412 can reach the spring clamping means 100, the printed circuit board 140, and optionally the lower housing 200, has cutouts 202 through which the contact sections 415 or contact tongues 415 can reach the contact spaces 101 (FIGS. 9, 12 & 23) of the spring clamping means 100, coming from below. If an electrical contact of the contact sections 415 or contact tongues 415 with the spring clamping means 100 is produced, the printed circuit board 140 ensures, via printed conductors 142 and optionally additional electrical/electronic components 160 (see FIG. 6), transmission of electrical energy to the contact means 130 for the electrical connecting cables 30.

An individual electrical contact means 130 is preferably constructed like a holder which has in particular two receptacles 131 which are formed from in each case two spring arms 132 located opposite each other. Between the spring arms 132 there can then be received and clamped a stripped free end section of the conductor 33 (see FIGS. 19-22) of an attached end section 31 of the connecting cable 30, by means of which an electrically conductive connection can be produced between the solar module 4 via the contacting means 10 and the electrical connecting cable 30. In this case, the electrical contact means 100 (see FIGS. 9-12 and 23 & 24) and/or the contact means 130 are preferably formed as SMD-capable components, and this should preferably also apply to the additional electrical/electronic components 160 (not shown in FIGS. 4 & 5). For positioning, the SMD-capable components may have legs 160 which can be inserted into recesses corresponding thereto in the printed circuit board 140.

The lower housing 200, which is preferably formed as a substantially completely circumambient frame, holds, by means of a latch element 203 laterally cut out therefrom, the printed circuit board in the lower housing 200, which has a corresponding edge or similar as a counter-surface, by means of which the lower housing 200 can be glued to the solar module 4. In this case, the lower housing 200 preferably already has, for automated mounting on the solar module 4, in particular on this edge, an adhesive layer 201 or an adhesive tape 210 which is preferably completely circumambient. The lower housing 200 is further formed such that it provides a guide, e.g. via the side walls thereof, for the cover 210 or the upper housing 210 which is to be placed or mounted thereon.

FIGS. 7 & 8 show the second embodiment of the contacting means 10 embedded in a lower housing 200, again without a cover 210, with initially an electrical lead frame 150 as actual contacting means 10 being explained in greater detail with reference to FIG. 6. Instead of accommodating the required components on a printed circuit board 140, they are realised within the lead frame 150 or provided thereon. In this case, it is preferred to produce the electrical contact means 100 and/or the electrical contact means 130 at least partially from a material of the lead frame 150, i.e. to bend them out of a flat stamping blank. This relates in particular to electrical contact cages 110 of the contact means 100 (see below) and/or the spring arms 132 or the receptacles 131 of the contact means 130. Further electrical and/or electronic components 160, such as a diode 161, a choke 162 or a varistor 163, in particular a metal oxide varistor (MOV) 163, may be provided between the printed conductors 152 of the lead frame 150, in particular be soldered thereto.

The contact means 100 and in particular the contact cages 110 thereof, and/or the contact means 130 and in particular the spring arms 132 or receptacles 131 thereof, are preferably constructed as in the first embodiment of the electrical contacting means 10. In this case, however, electrical contact tabs 115, 135 (see FIGS. 9-12 or FIG. 4), such as soldering connections 115, 135, are omitted, the contact cages 110 and/or the spring arms 132 or receptacles 131 being formed integrally with the lead frame 150. Chronologically after production of the lead frame 150, which may also include provision of clamping springs 120 or terminal clamps 120 (see FIGS. 9-12 and 23 & 24) on the contact cages 110 of the contact means 100, production of the lower housing 200 takes place.

That is to say, the lead frame 150 is preferably encapsulated or potted with a plastics material, which in so doing is imparted a desired form. In this case, care should be taken that a preferably single elongate recess 202 for the contact sections 415 or contact tongues 215 of the mating contact element 412 remains. Further, lead frame bridges 151 must remain accessible through the encapsulation 200, these being severed after the encapsulating operation. These hold the lead frame 150 stably during encapsulation. Further, again an adhesive layer 201 or an adhesive tape 210 may be provided in particular on a lower outer edge of the encapsulation 200 (see FIG. 8) preferably in a completely circumambient manner.

FIGS. 9-12 show in each case a first variant of the electrical contact means 100 for the contacting means 10 or the lower housing 200 in the form of spring clamping means 100. In this case, only the embodiment for printed circuit boards 140 is illustrated; however, the contact tabs 115 and the legs 116 may be omitted and an appropriate side wall 112, 114 of the spring clamping means 100 may be formed in one piece in terms of material with a lead frame 150, which yields an embodiment for lead frame 150. Further, it is possible to provide the embodiment illustrated in FIGS. 9-12 on a lead frame 150, the legs 116, which serve for positioning the spring clamping means 100, preferably being omitted; it is however also possible to provide corresponding recesses for the legs 116 in the lead frame 150.

FIGS. 9 & 12 show the spring clamping means 100 in its open position O or the open position O of its clamping tongue 120 or clamping spring 120, this exposing a contact space 101 which is partially defined by it and a contact cage 110 of the spring clamping means 100. In this case, the clamping spring 120 is provided under mechanical pre-stress on the spring clamping means 100 or the contact cage 110 thereof, which preferably also corresponds to a delivery condition and/or an assembled state of the spring clamping means 100. FIG. 10, on the other hand, shows a closed position S of the clamping spring 120 or of the spring clamping means 100, with the clamping spring 120 being mechanically at least partially relieved of stress and the contact space 101 due to the lack of contact tongue 415 of the mating contact element 412 being at least partially, but preferably completely, closed, the latter depending mainly on a spring excursion of the clamping spring 120. FIG. 11 shows the re-setting of the open position O of the clamping spring 120 out of the closed position S thereof, with a manual tool 5, such as a screwdriver 5, or alternatively an automatic tool 5, such as for example an industrial robot, being able to re-establish the open position O by a simple movement.

In the present example of embodiment, the spring clamping means 100 has two components, the contact cage 110 and the clamping spring 120, which is fastened to the contact cage 110. The contact cage 110—apart from the contact tabs 115 for electrical onward contacting and the legs 116 for the positioning thereof—is formed approximately in a pan-shape. In this case, "pan-shape" is to be understood to mean a profile piece 110 which is for example a U-profile or V-profile which is open on three sides or is formed as a short piece of a channel which internally has preferably a U-shaped groove. In this case it is preferred for this profile piece 110 to be open on both end faces. It is however also possible to close one or both end faces.

In particular, the contact cage 110 should be a profile piece 110 which is open on three sides, i.e. have a certain extent in breadth, so that good contact overlap is ensured, which piece preferably has mirror-symmetrical side walls 112, 114. The side walls 112, 114 and a top wall 113 which connects them in one piece in terms of material are in this case preferably cut from a thin metal sheet and bent, the side walls 112, 114 preferably being arranged in each case substantially at a right angle, preferably substantially having the same height and being arranged substantially parallel, with respect to the top wall 113. Overall, the side walls 112, 114 and the top wall 113 preferably span a cube or a cuboid. The top wall 113 may furthermore serve as a suction surface for gripping the spring clamping means 100 provided for automatic assembly.

The side wall 112, referred to below as first side wall 112, has an electrical contact section 111 against which the contact section 415 or the contact tongue 415 of the mating contact element 412 can be pressed in the closed position S of the clamping spring 120 by means of the clamping spring 120, with preferably a surface contact, which ideally is rectangular, being formed and having a low electrical contact resistance. In this case, the contact section 111 is provided on the first side wall 112 or is preferably an integral constituent thereof, i.e. further in electrically conductive contact with the contact tabs 115 which are preferably formed as soldering connections 115, or the lead frame 150.

The clamping spring 120 is fastened to a second side wall 114 located opposite the first side wall 112. In this case, the clamping spring 120 lies in surface-to-surface contact with an attached longitudinal end section 122 internally on the second side wall 114 and surrounds at least one side wheel [sic] of the second side wall 114 by means of one, but in particular two, tabs 127, which are preferably bent onto an outer side of the second side wall 114. For this, the second side wall 114 may be recessed on its side edge, with a depth of the recess corresponding preferably to approximately a thickness of the clamping spring 120. Further, additionally, or on its own a spot weld 117 can fix the clamping spring 120 to the second side wall. The clamping spring 120 may however also be fastened externally to the contact cage 110 and extend e.g. through a slot in the contact cage 110 into the interior of the contact cage 110 (not shown in the drawings).

Starting from a parallel arrangement of the attached longitudinal end section 122 with the second side wall 112, the two-dimensional clamping spring 120 extends in its longitudinal direction initially over a bend top wall 113 and then further in the bend back again in an opposite direction into the interior of the contact cage 110, and extends at an angle in the direction of the electrical contact section 111 of the contact cage 110. In this case, the contact spring 120 is bent over by more than 90°, in particular by approximately 135° or even more. In a region located opposite the contact section 111, the contact spring 120 has a clamping section 121 by means of which the contact spring 120 in the closed position S presses the contact section 415 or the contact tongue 415 of the mating contact element 412 against the contact section 111 (see also FIGS. 14, 15 & 17, 18 & 23). For this, the clamping section 121 is preferably formed as a bent section 121 which covers an angle of more than approximately 90°, in particular 135° or more. With these two bent sections, the clamping spring 120 is bent in each case in only one plane.

After the bent section 121, the clamping spring 120 changes into a free longitudinal end section 123, with the considerable free longitudinal end section 123 within the clamping spring 120 being arranged approximately at a right angle with respect to the attached longitudinal end section 122. In the case of the first variant, it is preferred for the free longitudinal end section 123 of the clamping spring 120 to extend through a cutout 118 in the second side wall 114 of the contact cage 110. Instead of a cutout 118, the second side wall 118 may also be made long or short such that the free longitudinal end section 123 extends past a free end of the second side wall 118. In this case, then part of the free longitudinal end section 123 protrudes preferably substantially at a right angle from the second side wall 114.

The attached longitudinal end section 122 of the clamping spring 120 has on its longitudinal end a locking tab 124 formed thereon, which is preferably arranged substantially parallel to the second side wall 114 and extends in the direction of the free longitudinal end section 123. In this case, the locking tab 124 and the free longitudinal end section 123 are configured such that in the open position O of the clamping tongue 120 the locking tab 124 engages in a locking recess 125 in the free longitudinal end section 123, and in the closed position S of the clamping tongue 120 the locking tab 124 is either seated on the free longitudinal end section 123 or the free longitudinal end section 123 has a step, so that no mechanical contact occurs, or a free end of the free longitudinal end section 123 disappears behind the locking tab 124 in the direction of the interior of the contact cage 110.

For the locking tab 124 and the projection-through of the free longitudinal end section 123, the second side wall 114 has a cutout 118, in the lower region of which the free longitudinal end section 123 extends through and thereover, coming from above, the locking tab 124 extends downwards, the locking tab 124 engaging in the locking recess 125 of the free longitudinal end section 123, which arranges the clamping spring 120 under pre-stress on the contact cage 110. In this case, the locking tab 124 in the region of the cutout 118 may be bent into the cutout 118, and may thus lie at least partially in a plane of the second side wall 114.

The locking tab 124 may be bent over, protruding away outwards from the contact cage 110, at its free end, so that more secure holding of the free longitudinal end section 123 on the locking tab 124 is made possible. Actuation of the free longitudinal end section 123 then takes place no longer only by pressing downwards in the direction of a fastening of the contact cage 110, but by pulling the free longitudinal end section 123 away from the contact cage 110 and by pressing downwards. Actuation of the free longitudinal end section 123 may in this case take place e.g. by means of the tool recess 126 discussed below. Further, care should be taken that the locking recess 125 is large enough for the bent-over locking tab 124 to pass through. The locking tab 124 in this case is preferably an angled part of the clamping spring 120.

Adjacent to the locking recess 125, the free longitudinal end section 123 may have a tool recess 126, by means of which and a tool 5 corresponding thereto the clamping spring 120 can be brought out of its closed position S back into its open position O, which is illustrated in FIG. 11. In this case, the tool recess 126 is provided in the direction of the free end of the free longitudinal end section 123 behind the locking recess 125 in the free longitudinal end section 123 as a preferably rectangular cutout 126. It is also possible, instead of the tool recess 126, to provide a step or a stop in or on the free longitudinal end section 123.

A tool tip can be inserted into the tool recess 126, which tip, for re-locking of the clamping spring 120, preferably supported on the contact cage 110, is pivoted in the direction of the arrow, i.e. in the direction of the first side wall 112 of the contact cage 110, or is moved substantially linearly and if applicable lifted in a direction opposite thereto, the free longitudinal end section 123 being pulled out of the cutout 118 until the locking recess 125 again latches on/in the locking tab 125. This may also take place in automated manner, since the tool recess 126 in the open position O is readily accessible from the outside. That is to say that the tool recess 126 in the open position O does not, or does only slightly, project into the cutout 118 in the second side wall 114.

Preferably in each case at least one contact tab 115 for electrical contacting with a printed conductor 142 of a printed circuit board 140 and at least one positioning leg 116 is provided on one free end in each case of the side walls 112, 114. For application of the contact cage 110 to a lead frame 150, the contact tabs 115 and the positioning legs 116 may be omitted, with instead the first and the second side wall 112, 114 being connected or formed integrally with the lead frame 150.

The positioning legs 116, of which two are provided on the free end of the second side wall 114 preferably in each case located on the outside, and of which an individual one is provided preferably centrally on the free end of the first side wall 112, protrude from and parallel to the respective side walls 112, 114. The contact tabs 115, of which one is provided preferably centrally on the free end of the second side wall 114, and of which two are provided on the free end of the first side wall 112 preferably in each case located on the outside, in this case protrude preferably outwards substantially perpendicularly from the respective side walls 112, 114. In a respective transitional region from the side walls 112, 114 to the positioning legs 116 and contact tabs 115, the respective side wall 112, 114 may extend somewhat obliquely outwards, which imparts greater rigidity to the contact cage 110.

Figure 15:
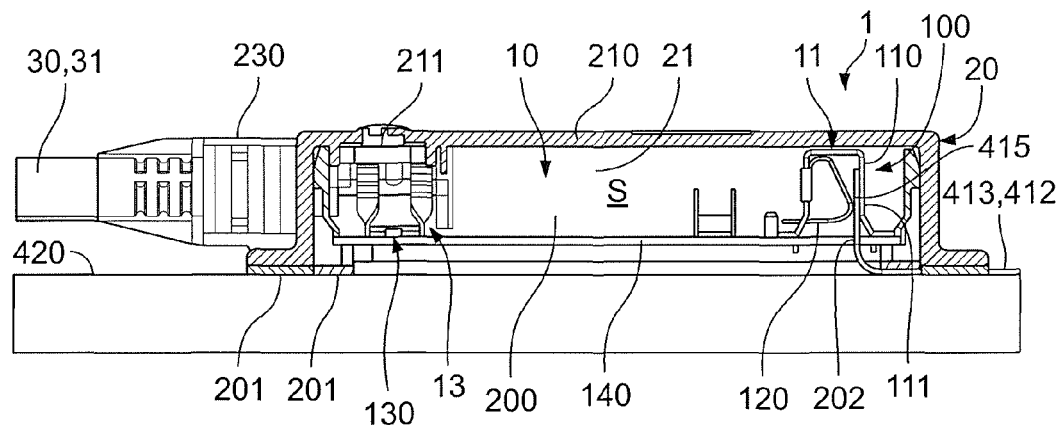

With reference to FIGS. 13-15 and FIGS. 16-19, mounting of the electrical connection device 1 on a rear side of a rear-side layer 420 of a solar module 4 will be explained in greater detail below, it being possible for the respective assembly step to take place manually or in automated manner. FIGS. 13-15 then relate to the assembly of a connection device 1 with an electrical contacting means 10 which comprises a printed circuit board 140, and FIGS. 16-19 to the assembly of a connection device 1 with an electrical contacting means 10 which comprises a lead frame 150. The individual assembly steps are however analogous to one another, so the following description applies equally to both embodiments of the connection device 1.

First, a housing part 200 of the connection device 1 is brought into a correctly oriented position on the rear-side layer 420 and is fastened thereto, which may be done e.g. by means of an adhesive tape 201 which is already glued to an underside of the housing part 200. Other fastening possibilities such as a latch means or a screw connection may of course be used. In this case, the housing part 200 is preferably the populated lower housing 200 described above, with, upon assembly, the contact tongues 415 or contact sections 415 of the electrical mating contact element 412 which protrude from the rear-side layer 420 being advanced through the cutout(s) 202 into the appropriate contact spaces 101 of the electrical spring clamping means 100 of the contacting means 10. This applies analogously also to the third embodiment of the connection device 1, see FIGS. 25-27.

Following this, the clamping springs 120 of the spring clamping means 100 are brought out of their open positions O manually or automatically into their closed positions S, the free ends of the free longitudinal end sections 123 of the clamping springs 120 being pressed substantially downwards in the direction of the rear-side layer 420. In so doing, the locking recesses 125 become disengaged from the locking tabs 124, and the free longitudinal end sections 123 of the clamping springs 120 move, together with their clamping sections 121, owing to their mechanical pre-stress in the direction of the electrical contact sections 111 of the contact cages 110, with an electrically conductive connection being set up between the contact tongues 415 or the contact sections 415, the contact cages 110 and the electrical onward contacting thereof (printed circuit board 140, lead frame 150). This can be checked visually and electrically. This again applies analogously to the third embodiment of the connection device 1, with, here, chronologically following this, only the cover 210 still needing to be mounted.

Following this, a second housing part 210 of the connection device 1 is placed in a correctly oriented position on the first housing part 200, the first housing part 200 guiding the second housing part 210. In this case, the housing part 210 is preferably the upper housing 210 described above or the cover 210 described above, the lower housing 200 preferably being designed such that upon the mounting 200 of the upper housing 210 the lower housing 200 guides the upper housing 210. In this case, electrical contacting of the connecting cables 30 or the electrical conductors 33 thereof with the electrical contact means 130 of the printed circuit board 140 or the lead frame 150 takes place (see below).

Preferably the conductor 33 is accommodated in the receptacle 131 or clamped between the spring arms 132, which sets up an electrically conductive connection between the printed circuit board 140 or the lead frame 150 and the electrical connecting cable 30. This can be checked electrically. Also the second housing part 210 is mounted on the rear-side layer 420 of the solar panel 4 by means of an adhesive 201. Accordingly, both the first housing part 200 and the second housing part 210 are mounted directly on the solar panel 4. This, inter alia, has the advantage of being able to dispense with an additional seal, such as an O-ring, between the two housing parts 200, 210. The adhesive 201 thus also serves as a sealant.

Instead of the manual or automatic actuation of the free ends of the free longitudinal end sections 123 of the clamping springs 120, which is described above, the upper housing 210 may also be designed such that, upon its assembly, it assumes the actuation of the clamping springs 120, and hence the above step can be dispensed with. In this case, the upper housing 210 may have a land or a plurality of projections (not shown in the drawings) such that, upon the mounting of the upper housing 210 on the lower housing 200, the clamping springs 120 are triggered, i.e. move from their open positions O into their closed position S. For this, the free longitudinal ends should protrude far enough into the inner chamber 21 of the connection device 10. That is to say that the pre-stressed spring clamping means 100, trigger automatically upon the mounting of the upper housing 210. This can likewise be applied to the third embodiment of the connection device 1.

Below, two embodiments of a mounting of the connecting cable 30 on the upper housing 210 will be explained in greater detail with reference to FIGS. 19 & 20 and FIGS. 21 & 22. In this case, a longitudinal end section 31 of the connecting cable 30 in question is fixed on/in the upper housing 210 or cover 210 such that, upon later assembly of the upper housing 210 with the lower housing 200, an electrical contact of the conductor 33 of the connecting cable 30 with the electrical contact means 130 is possible or is thus produced or set up (see above).

For this, the connecting cable 30 is stripped at its longitudinal end 31 and provided on/in the upper housing 210 as illustrated in FIGS. 20-22. That is to say that the stripped section of the connecting cable 30 in this case is preferably provided completely protruding into the upper housing 210, it being supported with its free end preferably on a stop 212. That is to say that the stripped end section of the connecting cable 30 projects freely into the upper housing 210 such that upon the mounting of the upper housing 210 on the lower housing 200 the electrical contact between the conductor 33 and the electrical contact means 130 takes place.

In this case, preferably a counter-surface 213 of the upper housing 210 may centrally support the stripped conductor 33, i.e. the spring arms 132 of the electrical contact means 130 act on the conductor 33 in each case next to the counter-surface 213 upon the mounting of the upper housing 210. Further, the stop 212 likewise assumes the function of a counter-surface for a free end of the conductor 33 by means of a projection 214. That is to say that the stripped conductor 33 is held in the upper housing 210 by means of the counter-surface 213, the projection 214 and the fastening of the connecting cable 30 to the upper housing 210 such that upon the mounting of the upper housing 210 it can be brought together in electrically contacting manner with the contact means 130. Located opposite the stop 212, an electrical insulation 34 of the connecting cable 30 is fixed on the upper housing 210, which is preferably effected by means of an encapsulation 300. This may however also be effected in a different manner, e.g. by means of a cable gland or by clamping. In this case, a seal 310 (FIG. 20) which offers additional protection from water and dirt may be provided on the electrical insulation 34.

In the first embodiment, the electrical insulation 34 is provided, preferably chronologically before the mounting of the seal 310 and preferably shortly before the encapsulation with a suitable plastics compound or rubber compound, with a notch 340 or recess 340 which is at least partially circumambient in particular in the peripheral direction of the connecting cable 30 and optionally at least partially remains, into which notch or recess the plastics compound or rubber compound enters upon the encapsulation or potting process. That is to say that after an encapsulation or potting process a composite which overlaps in the longitudinal direction of the connecting cable 30 is produced in the region of the notch(es) 340 or recess(es) 340, which increases a tightness and a cable pull-out force. By re-forming the notch(es) 340 or recess(es) 340 upon or after the encapsulation or potting process, further a force acts from the inside on the encapsulation 300, which additionally increases the tightness and the cable pull-out force.

Before the connecting cable 30 with the upper housing 210 is encapsulated together at the connectors 230, in the second embodiment, immediately before the upper housing 210 is placed in the injection mould, deformation of an electrical insulation 34 of the connecting cable 30 has to be carried out. At the start of the connecting cable 30, the electrical insulation 34 has to be removed to a certain length, then the electrical insulation 34 has to be compressed by a suitable tool, e.g. as illustrated in FIG. 21. In this case it is preferred for the electrical insulation 34 to be compressed in a preferably completely circumambient manner on a free longitudinal end section—compressed section 341—and in at least one section—compressed section 342—behind it. The connecting cable 30 is pushed into the upper housing 210 directly after compressing and is placed in the injection mould before the electrical insulation 34 re-forms again. The injection operation should take place immediately following this.

Due to the effect of heat during the injection process, the electrical insulation 34 of the connecting cable 34 attempts to re-form again. This means that a force is obtained which presses against the encapsulation 300 and thereby achieves a better seal. Due to the reduction in the diameter at the start of the electrical insulation 34 (compressed section 341) it is possible, to form a smaller opening than the original diameter of the connecting cable 30 in the upper housing 210; the re-formation of the electrical insulation 34 in the interior of the upper housing 210 increases the pull-out force and improves the seal.

Due to the reduction in diameter at the free longitudinal end section of the electrical insulation 34 (compressed section 341), a stop is obtained upon the introduction of the connecting cable 30 which additionally acts as a seal during the encapsulation process and prevents plastic material from flowing into the inner chamber. Further, it is preferable for the compressed section 341 in the longitudinal direction of the connecting cable 30 to be of such length, or for the stop 212 of the upper housing and/or the stripped section of the connecting cable 30 to be of such dimensions, that the compressed section 341 protrudes into the inner chamber of the upper housing 210 and can re-form there. This re-formed region 343 additionally seals off the connecting cable 30 internally on the upper housing 210. Further, the cable pull-out force increases.

According to the invention, a complete or also only a partially automated mounting of the connection device 1 according to the invention on the solar module 4 is possible, the mating contact means 412 of the solar module 4 being able to be electrically contacted in automated manner, and checking of this electrical contacting being able to be carried out visually and/or electrically. Electrical contacting of the connecting cable 30, which can also be referred to as a solar cable 30, takes place upon the mounting of the upper housing 210. The electrical contact means 100, 130 are always located in exactly the same position for a flash test connection in all the connection devices 1. The printed circuit board 140 or the lead frame 150 are of such dimensions that future further development steps can be realised thereon without having to change the connection device 1. The printed circuit board 140 can be automatically populated and soldered, e.g. by means of a reflow process.

FIG. 23 shows a second variant of the electrical contact means 500 for the contacting means 10 or the lower housing 200, in the form of a spring clamping means 500. In this case, only the embodiment for conductor bars 550 or lead frames 150 is illustrated. However, contact tabs 115 and/or legs 116 may be provided which are formed on an appropriate front wall and/or an appropriate lateral wall 512, 514 of the spring clamping means 500 in one piece in terms of material therewith, which yields an embodiment e.g. for a printed circuit board 140 or as an SMD component. Features of the first variant may of course also be transferred to a spring clamping means 500 of the second variant, and vice versa.

The second variant of the spring clamping means 500 according to the invention differs from the first variant mainly by a contact cage 510 of different orientation, both variants preferably having a three-sided contact cage 110, 510, the sides of which are preferably substantially closed. Conversion of the contact cage 110 of the first variant into a contact cage 510 of the second variant takes place such that initially the contact cage 110 (510) is tilted into an electrical connecting plane of the contact cage 110 (510) with an onward contacting (e.g. lead frame 150 or conductor bar 550) and is then turned by approximately 90° in this plane.

That is to say that the contact cage 110 (510) is turned such that a top wall 113 (513) of the contact cage 110 (510) of the first variant becomes a front wall 513 (113) of the contact cage 510 (110) of the second variant. Analogously, of course a clamping spring 120 of the first variant may also be converted into a clamping spring 520 of the second variant, with in that case, following this, in order to obtain a correct orientation of the entire spring clamping means 500 (100) again, the latter having to be turned back and tilted back with the same movements.

Upon converting from the first to the second variant of the invention, the top wall 113 (513) of the contact cage 110 (510) becomes the front wall 513 (113), and the two side walls 112, 114 (512, 514) become the two lateral walls 512, 514 (112, 114) of the contact cage 510 (110). In this case, the electrical contact section 511 (111) of the contact cage 110 is formed internally on the front wall 513 (113). Further, in the second variant the clamping spring 120 is not fastened to the second side wall 114, but between the two lateral walls 512, 514, namely in each case on a longitudinal end section of the appropriate lateral wall 512, 514 which is remote from the front wall 513.

For the fastening of the clamping spring 520 (see also FIG. 24), the latter has on its attached longitudinal end section 522, laterally protruding beyond the actual attached longitudinal end section 522, at least one, but preferably on both long sides in each case one elongate fastening tab 527, which is formed in particular integrally with the attached longitudinal end section 522. The respective fastening tab 527 in this case extends from an attached end of the attached longitudinal end section 522 in the direction of a locking tab 524 of the clamping spring 520, which may be configured as described for the first variant.

In the embodiment of the clamping spring 520 illustrated in FIG. 24, the free end of the locking tab 524 which is bent back in the direction of the free end of the free longitudinal end section 523 of the contact spring 520 is also clearly illustrated. Further, the attached longitudinal end section 522 of the clamping spring 520 may have a reinforcing bead 528, which is preferably arranged adjacent to the locking tab 524 in the attached longitudinal end section 522.

In preferred embodiments of the second variant, the clamping spring 520 has at least one, but preferably two, three, four or five, longitudinal slots 529 formed in particular as through-slots 529. In this case, the respective longitudinal slot 529 extends at least over a clamping section 521 or bent section 521 of the clamping spring 520. This produces a plurality of contacting regions which in later use of the spring clamping means 500 press the electrical contact tongue 415, e.g. of a foil conductor, on a plurality of regions against the electrical contact section 511 of the contact cage 510, which permits secure electrical contacting which is adapted to the conditions.

The longitudinal slot 529 in question may not only extend over the clamping section 521 of the clamping spring 520, but may furthermore on one hand extend as far as the attached longitudinal end section 522 (see FIG. 24) and on the other hand as far as a locking recess 525. Depending on how long the longitudinal slot or slots 529 are, a rigidity of the clamping spring 520 and hence also a clamping force of the clamping spring 520 can be set. The feature of the longitudinal slot or slots 529 can in particular also be applied in embodiments of the first variant of the invention.

In a mounted state of the clamping spring 520 in the contact cage 510 (see FIG. 23), the clamping spring 520 is seated with its fastening tabs 527 in the contact cage 510; that is to say that the fastening tabs 527 are seated in slots 517 or recesses 517 in the contact cage 510, with in each case one slot 517 being provided in a lateral wall 512, 514 of the contact cage 510. The slot 517 in question in this case is provided on a region, remote from the front wall 513, which is substantially parallel to the front wall 513 in the lateral wall 512, 514 in question.

For secure seating of the fastening tabs 527 in the slots 517, and hence of the clamping spring 520 in the contact cage 510, the respective lateral wall 512, 514 has a folded edge 515 which is arranged directly adjacent to the appropriate slot 517 in the respective lateral wall 512, 514. That is to say that a region of the respective lateral wall 512, 514 which is adjacent to the respective slot 517 is bent somewhat outwards or preferably somewhat inwards, so that an edge is seated or acts on the slot 517 of the respective lateral wall 512, 514, on the fastening tab 527 in question. Preferably, in this case that region of the respective lateral wall 512, 514 which lies adjacent to the front wall 513 of the contact cage 510 is bent outwards or inwards.

The contact cage 510 is preferably provided on an electrical conductor bar 550, the contact cage 510 preferably being connected in terms of material in one piece with the conductor bar 550. That is to say that the contact cage 510 is preferably bent into shape from a material of the conductor bar 550, for which a corresponding, preferably substantially rectangular tab is formed on the conductor bar 550, which tab is then bent into shape to form the three-sided contact cage 510, which is then connected via an approximately 90° bend 554 (see FIG. 23) or a rectilinear connection (not shown in the drawings) to the conductor bar 550.

Preferably the contact cage 510 and hence also the spring clamping means 500 is seated in a receptacle 204 which is at least partially circumambient around the contact cage 510, which receptacle is preferably provided on a base of the lower housing 200; also provision of the receptacle 204 in a contacting means 10 separate from the housing 200, 210 of the connection device 1 is of course possible. In this case, the contact cage 510 is seated, at least with a lower (with reference to FIG. 23) section, inside the receptacle 204, the contact cage 510 preferably being latched in/on the receptacle 204.

For latching of the contact cage 510 in/on the receptacle 204, the receptacle 204 has a latch means 205, in particular a latch hook 205, which latches with the contact cage 510 and fixes the latter on/in the receptacle 204. Preferably the receptacle 204 has at least one, but in particular two or three, latch hooks 205 which protrude upwards therefrom, which hooks in a mounted state of the contact cage 510 latch in the receptacle 204 on an upper edge of the contact cage 510. That is to say that in each case a latch hook 205 latches on a free, upper end of the front wall 213 and the two lateral walls 212, 214 of the contact cage 510.

The lower housing 200 which is preferably formed as a substantially completely circumambient frame, which can also be regarded as an electrical contacting means 10, has on its base the receptacles 204 described above and a number of receptacles 206 for the conductor bars 550 which preferably corresponds thereto in [sic] a number of the receptacles 204. In this case, the of [sic] receptacles 206 are preferably formed as slots in which the conductor bars 550 are fastened, in particular clamped. The individual conductor bars 550 are electrically interconnected within the lower housing 200 via diodes 161. Further, a conductor bar 550 may have an electrical contact means 552 by means of which direct or indirect electrical contacting with an electrical connecting cable 30 is possible. This contact means 552 is in this case preferably provided as a contact tab 552 and/or as a soldering connection 552 preferably integrally on the conductor bar 550.

Further, the second variant of the spring clamping means 500 according to the invention, analogously to the first variant of the invention, has a contact space 501 and/or a tool recess 526 in the clamping spring 520. Furthermore, FIGS. 25-27 exhibit connectors 230 for the electrical connecting cables 30 in the form of screw connections on the lower housing 200.

The invention claimed is:

1. An electrical spring clamping means for an electrical connection device, including a connection device for a photovoltaic solar module, with an electrical contact section and a clamping spring which cooperates therewith, with the clamping spring in an open position being arranged under mechanical pre-stress within the electrical spring clamping means, and an electrical contact portion of an electrical mating contact element being able to be pressed against by the electrical contact section of the electrical spring clamping means by means of the clamping spring, in a closed position thereof; and the electrical spring clamping means comprising a contact cage, the electrical contact section of the electrical spring clamping means being provided in the contact cage, the clamping spring comprising an attached longitudinal end section and a free longitudinal end section, the attached longitudinal end section of the clamping spring being fastened to a side wall of the contact cage wherein the contact cage includes a contact tab, the attached longitudinal end section of the clamping spring comprising a locking tab which protrudes or protrudes away from or on the contact cage and the free longitudinal end section of the clamping spring comprising a locking recess positioned above the contact tab.

2. An electrical spring clamping means according to claim 1, with, in the open position of the clamping spring, a contact space being formed between the clamping spring and the electrical contact section of the electrical spring clamping means, in which the electrical contact section of the electrical mating contact element can be provided substantially free of force, and in the closed position of the clamping spring, the electrical contact portion of the electrical mating contact element can be clamped preferably directly between the clamping spring and the electrical contact section of the electrical spring clamping means.

3. An electrical spring clamping means according to claim 1, the electrical contact section being formed on a tab, an angled contact or a contact cage or a contact pan, and the tab, the angled contact or the contact cage being connected in one piece, in particular in one piece in terms of material, to a lead frame or a conductor bar, or the tab, the angled contact or the contact cage being formed as a soldered part, in particular as an SMD soldered part.

4. An electrical spring clamping means according to claim 1, the electrical contact section being formed or provided on the contact cage of the electrical spring clamping means, and the clamping spring likewise being fastened to the contact cage, and the completely functionally efficient electrical spring clamping means having the contact cage and the clamping spring.

5. An electrical spring clamping means according to claim 4, the clamping spring being at least partially located within the contact cage wherein the clamping spring is bent over in a longitudinal direction by at least one of: approximately 90°, approximately 180°, and approximately 270°, the clamping spring including a lateral cross-section having a form substantially consistent with the form of at least one of a triangle, an oval, and a circle.

6. An electrical spring clamping means according to claim 1, the spring clamping means being designed such that when in the closed position the electrical spring clamping means is force-locking;

wherein force-locking the electrical spring clamping means does not transmit any forces outwards onto a mounting base, such as in particular a printed circuit board, an electrical lead frame or a conductor bar.

7. An electrical spring clamping means according to claim 4, the contact cage having substantially the form of a pan, and the electrical contact section of the electrical spring clamping means being formed internally on a first side wall of the contact cage, and the clamping spring being fixed on a top wall or a second side wall of the contact cage, and the clamping spring, preferably starting from a fastening location relative to the contact cage, extending inwards into the contact cage and in the direction of the electrical contact section of the electrical spring clamping means, and substantially at one level of the electrical contact section of the electrical spring clamping means having a clamping section by means of which the electrical contact portion of the mating contact element can be pressed against by the electrical contact section of the electrical spring clamping means.

8. An electrical spring clamping means according to claim 7, the free longitudinal end section of the clamping spring protruding beyond the second side wall of the contact cage, the clamping section of the clamping spring preferably being formed between the attached longitudinal end section of the clamping spring and the free longitudinal end section of the clamping spring, in particular as a bent section, and preferably the attached longitudinal end section of the clamping spring and the free longitudinal end section of the clamping spring being substantially perpendicular to each other.

9. An electrical spring clamping means according to claim 8, the clamping spring being bent such that the free longitudinal end section of the clamping spring projects through the second side wall of the contact cage or protrudes somewhat therefrom, and in an open position of the clamping spring the locking tab engaging in the locking recess, and for the closed position of the clamping spring the free longitudinal end section being preferably formed such that the locking tab is seated on the free longitudinal end section.

10. An electrical spring clamping means according to claim 9, the contact cage of the electrical spring clamping means being formed as a component suitable for a printed circuit board, in particular as an SMD-capable component, with on a free longitudinal end of the first side wall of the contact cage and/or of the second side wall of the contact cage, preferably at least one electrical contact tab which protrudes away, in particular which protrudes away laterally, therefrom being provided, which can be soldered to the printed circuit board.

11. An electrical spring clamping means according to claim 7, wherein the electrical contact section of the electrical spring clamping means being formed internally on a front wall of the contact cage, and the clamping spring being fixed on a first and/or a second lateral wall of the contact cage, with the two lateral walls of the contact cage preferably protruding substantially perpendicularly away from the front wall and receiving the clamping spring between them, and the clamping spring having, substantially at a level of the electrical contact section of the electrical spring clamping means, a clamping section, by means of which the electrical contact portion of the mating contact element can be pressed against by the electrical contact section of the electrical spring clamping means.

12. An electrical spring clamping means according to claim 9, the free longitudinal end section of the clamping spring protruding, preferably beyond a first or a second lateral wall of the contact cage, on an open side of the contact cage, with the clamping section of the clamping spring preferably being formed between the attached longitudinal end section of the clamping spring and the free longitudinal end section of the clamping spring, in particular as the bent section, and preferably the attached longitudinal end section of the clamping spring and the free longitudinal end section of the clamping spring being substantially perpendicular to each other, and preferably in the open position of the clamping spring the locking tab engaging in the locking recess, and for the closed position of the clamping spring the free longitudinal end section of the clamping spring being in particular formed such that the locking tab is seated on the free longitudinal end section of the clamping spring.

13. An electrical spring clamping means according to claim 12, the attached longitudinal end section of the clamping spring having the locking tab which is seated in the locking recess of the contact cage, and
- the contact cage preferably having a folded edge on the recess which locks the locking tab in the locking recess, and
- the attached longitudinal end section of the clamping spring preferably having a bead for reinforcing the attached longitudinal end section.

14. An electrical spring clamping means according to claim 13, the clamping spring, at least in a region of a clamping section of the clamping spring, having at least one longitudinal slot which extends in a longitudinal direction relative to the clamping spring, and is preferably formed as a through-slot,
- the longitudinal slot extending away from the clamping section in both longitudinal directions of the clamping spring in the direction of the free longitudinal end section of the clamping spring and of the attached longitudinal end section of the clamping spring.

15. An electrical spring clamping means according to claim 14, the longitudinal slot beginning adjacent to or on the attached longitudinal end section of the clamping spring, and extending across the clamping section and ending adjacent to the locking recess in the clamping spring,
- the longitudinal slot being provided in the bent section of the clamping spring which extends over at least approximately 90°, in particular over at least approximately 180°, preferably over at least approximately 195°, particularly preferably over approximately 210° or in particular preferably over approximately 225°.

16. An electrical spring clamping means according to claim 15, wherein the locking tab can be engaged in the locking recess of the free longitudinal end section of the clamping spring, and
- the locking tab and the locking recess or the attached longitudinal end section of the clamping spring and the free longitudinal end section of the clamping spring being positioned and including such dimensions that in an engaged state of the locking tab in the locking recess the open position of the clamping spring is realized.

17. An electrical spring clamping means according to claim 16, the free longitudinal end section of the clamping spring, in the direction of its free end, adjacent to the locking recess, having a tool recess, into which in the closed position of the clamping spring a tool can be inserted, wherein by inserting the tool into the tool recess the clamping spring can be brought back into its open position.

18. An electrical lead frame or electrical conductor bar for an electrical connection device, in particular a connection device for a photovoltaic solar module, with
- an electrical spring clamping means comprising an electrical contact section and a clamping spring which cooperates therewith, with the clamping spring in an open position being arranged under mechanical pre-stress within the electrical spring clamping means, and an electrical contact portion of an electrical mating contact element being able to be pressed against by the electrical contact section of the electrical spring clamping means by means of the clamping spring, in a closed position thereof;
- the electrical spring clamping means comprising a contact cage,
- the electrical contact section of the electrical spring clamping means being provided in the contact cage,
- the clamping spring comprising an attached longitudinal end section and a free longitudinal end section,
- the attached longitudinal end section of the clamping spring being fastened to a side wall of the contact cage wherein the contact cage includes a contact tab,
- the attached longitudinal end section of the clamping spring comprising a locking tab which protrudes or protrudes away from or on the contact cage and the free longitudinal end section of the clamping spring comprising a locking recess positioned above the contact tab; and
- wherein a contact cage of the electrical spring clamping means being a constituent of the lead frame or of the conductor bar and the lead frame or the conductor bar optionally being encapsulated.

\* \* \* \* \*